US012624174B2

(12) United States Patent
Kingsbury et al.

(10) Patent No.: US 12,624,174 B2
(45) Date of Patent: May 12, 2026

(54) HYDROGEN-BOND ENRICHED ION EXCHANGE MEMBRANES

(71) Applicant: The University of North Carolina at Chapel Hill, Chapel Hill, NC (US)

(72) Inventors: Ryan Kingsbury, Carrboro, NC (US); Orlando Coronell, Cary, NC (US); Maruti Hedge, Carrboro, NC (US); Jingbo Wang, Los Angeles, CA (US); Wei You, Chapel Hill, NC (US); Theo Dingemans, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 1150 days.

(21) Appl. No.: 17/605,807

(22) PCT Filed: Apr. 23, 2020

(86) PCT No.: PCT/US2020/029625
§ 371 (c)(1),
(2) Date: Oct. 22, 2021

(87) PCT Pub. No.: WO2020/219752
PCT Pub. Date: Oct. 29, 2020

(65) Prior Publication Data

US 2022/0213281 A1 Jul. 7, 2022

Related U.S. Application Data

(60) Provisional application No. 62/837,674, filed on Apr. 23, 2019.

(51) Int. Cl.
*C08J 5/22* (2006.01)
*C08F 220/18* (2006.01)
*C08F 220/58* (2006.01)

(52) U.S. Cl.
CPC .......... *C08J 5/2231* (2013.01); *C08F 220/18* (2013.01); *C08F 220/58* (2013.01); *C08J 2333/04* (2013.01); *C08J 2333/24* (2013.01)

(58) Field of Classification Search
USPC .......... 521/27
See application file for complete search history.

(56) References Cited

U.S. PATENT DOCUMENTS 4,012,324 A 3/1977 Gregor
6,559,223 B2 5/2003 Green et al.
(Continued)

FOREIGN PATENT DOCUMENTS

CN 109546220 A 3/2019
CN 108164636 A 7/2019

OTHER PUBLICATIONS

Geise et al., "Ionic Resistance and Permselectivity Tradeoffs in Anion Exchange Membranes," ACS Apl. Mater. Interfaces, 5:10294-10301, (2013).

(Continued)

*Primary Examiner* — Fred M Teskin
(74) *Attorney, Agent, or Firm* — Alston & Bird LLP

(57) ABSTRACT

The presently disclosed subject matter generally relates to polymer networks having covalent crosslinks, non-covalent crosslinks, and ionic side groups, and methods of making and using same. Specifically, the disclosed polymer networks can be incorporated into membranes, which can be useful in, for example, electrodialysis. This abstract is intended as a scanning tool for purposes of searching in the particular art and is not intended to be limiting of the present disclosure.

20 Claims, 17 Drawing Sheets

(56) References Cited

U.S. PATENT DOCUMENTS

| | | | | |
|---|---|---|---|---|
| 6,649,138 | B2 | 11/2003 | Adams et al. | |
| 7,205,369 | B2 | 4/2007 | Song | |
| 7,250,462 | B2 * | 7/2007 | Kubota | C02F 1/56 526/287 |
| 7,462,363 | B2 | 12/2008 | Braun et al. | |
| 7,981,688 | B2 | 7/2011 | Stayton et al. | |
| 9,012,239 | B2 | 4/2015 | Winnik et al. | |
| 9,182,615 | B2 | 11/2015 | Greinert et al. | |
| 9,700,850 | B2 | 7/2017 | Zhang et al. | |
| 9,731,247 | B2 | 8/2017 | Lin et al. | |
| 10,088,476 | B2 | 10/2018 | Braun et al. | |
| 2003/0060521 | A1 | 3/2003 | Fisher | |
| 2013/0103157 | A1 | 4/2013 | Kourtis et al. | |
| 2016/0326046 | A1 | 11/2016 | Quinter et al. | |

OTHER PUBLICATIONS

Güler et al., "Performance-determining membrane properties in reverse electrodialysis," J. Membrane Science, 446:266-276, (2013).

Guler, E. et al., "Tailor-Made Anion-Exchange Membranes for Salinity Gradient Power Generation Using Reverse Electrodialysis," Chem Sus Chem, 5(11):2262-2270, (2012).

Kang, M.S. et al., "Water-swollen cation-exchange membranes prepared using poly(vinyl alcohol)(PVA)/poly(styrene sulfonic acid-co-maleic acid)(PSSA-MA)," Journal of Membrane Science, 207. 159-170, (2002).

Sata, T., "Recent trends in ion exchange membrane research," Pure & Appl. Chem., 58(12):1613-1626, (1986).

Tuncaboylu, D. et al., "Autonomic self-healing in covalently cross-linked hydrogels containing hydrophobic domains", Polymer, 54:6381-6383, (2013).

WIPO Application No. PCT/US2020/029625, PCT International Preliminary Report on Patentability mailed Nov. 4, 2021.

WIPO Application No. PCT/US2020/029625, PCTInternational Search Report and Written Opinion of the International Searching Authority mailed Aug. 7, 2020.

* cited by examiner

HYDROGEN-BOND ENRICHED ION EXCHANGE MEMBRANES

CROSS-REFERENCE TO RELATED APPLICATIONS

This application is a 35 U.S.C. § 371 national stage of International Application No. PCT/US2020/029625, filed Apr. 23, 2020, which claims priority to and the benefit of U.S. Provisional Application No. 62/837,674 filed Apr. 23, 2019, which are herein incorporated by reference in their entirety for all purposes.

STATEMENT REGARDING FEDERALLY SPONSORED RESEARCH

This invention was made with government support under grant numbers CBET-1264690 and CBET-1336532, awarded by the National Science Foundation (NSF). The government has certain rights in the invention.

BACKGROUND

Ion-exchange membranes (i.e., anion- and cation-exchange membranes) contain functional groups bearing positive and/or negative ionic charges fixed to a matrix. The synthesis, properties, and uses of such membranes has been reviewed in, for example, Synthetic Polymeric Membranes by R. E. Kesting, McGraw-Hill Book Company, New York (1971) and by T. Sata in Pure & Appl. Chem., 58, 1613 (1986). The ionic nature of these materials makes them hydrophilic, enabling them to find use in a variety of separation processes in which water is one of the principle components. These separation processes include electrodialytic processes such as electrodialytic concentration and separation processes, electrodialytic water splitting, electrolysis or electrolytic splitting of water, fuel cells for electricity generation, and pressure or chemical potential driven membrane processes such as ultrafiltration, reverse osmosis, piezodialysis, diffusion dialysis and pervaporation. For example, U.S. Pat. No. 4,012,324 describes the use of ion-exchange membranes for use in ultrafiltration and points out the advantages of these membranes with respect to fouling resistance. Ion-exchange membranes of the charge mosaic type are required for piezodialysis, a pressure driven system capable of separating salts from uncharged materials. Ion-exchange membranes have also been used for drying of gases and liquids. Unfortunately, conventional ion-exchange membranes exhibit a tradeoff relationship between high selectivity and high conductivity. Therefore, there remains a need for ion-exchange membranes having both high selectivity and high conductivity. These needs and others are met by the present invention.

SUMMARY

In accordance with the purpose(s) of the invention, as embodied and broadly described herein, the invention, in one aspect, relates to polymer networks having both covalent crosslinks, non-covalent crosslinks, and ionic side chains, methods of making same, and methods of using same in, for example, ion exchange membranes.

In ion exchange membranes (IEMs), it is desirable for membranes to have both high conductivity and high permselectivity; however high permselectivity and high conductivity typically exhibit a tradeoff relationship among commercial and lab synthesized IEMs. The subject matter disclosed herein shows that the introduction of hydrogen bond donor and/or acceptor monomers into a polymer membrane enables simultaneously higher conductivity and permselectivity than state-of-the-art membranes.

Thus, disclosed are polymer networks comprising: (a) a plurality of polymer backbones formed by co-polymerization of: (i) a first monomer having a hydrogen bond donor end group; (ii) a second monomer having a hydrogen bond acceptor end group; (iii) a third monomer having a positively charged or negatively charged end group; and (iv) a crosslinker; (b) a plurality of covalent crosslinks between the plurality of polymer backbones; (c) a plurality of reversible, non-covalent crosslinks between the plurality of polymer backbones and/or hydrogen bond donor and acceptor groups; and (d) a plurality of ionic side groups pendant from the plurality of polymer backbones. In certain embodiments, the polymer network can further comprise a fourth monomer serving as a chain extender.

Hydrogen bond formation is facilitated by providing a hydrogen bond donor and/or a hydrogen bond acceptor. In the polymer networks described herein, hydrogen bonds (non-covalent crosslinks) can form between a first monomer and a first monomer, for example methacrylic acids; or, a first monomer and a second monomer, for example methacrylic acid and DMAA; or, between a first monomer and a covalent crosslinker, for example methacrylic acid and ether or carbonyl groups on the crosslinker).

Also disclosed are membranes having a porous support and a polymer layer comprising a disclosed polymer network.

Also disclosed are methods for making a disclosed membrane.

Also disclosed are polymer films comprising a disclosed polymer network, wherein the polymer film is formed on a glass substrate.

Also disclosed are methods for making a polymer network, the method comprising co-polymerizing: (a) a first monomer having a hydrogen bond donor end group; (b) a second monomer having a hydrogen bond acceptor end group; (c) a third monomer having a positively- or negatively-charged end group; and (d) a crosslinker, wherein the polymer network comprises a plurality of polymer backbones, a plurality of covalent crosslinks between the plurality of polymer backbones, a plurality of reversible, non-covalent crosslinks between the plurality of polymer backbones, and a plurality of ionic side groups pendant from the plurality of polymer backbones.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE DRAWINGS

The accompanying figures, which are incorporated in and constitute a part of this specification, illustrate several aspects and together with the description serve to explain the principles of the invention.

Figure 1:
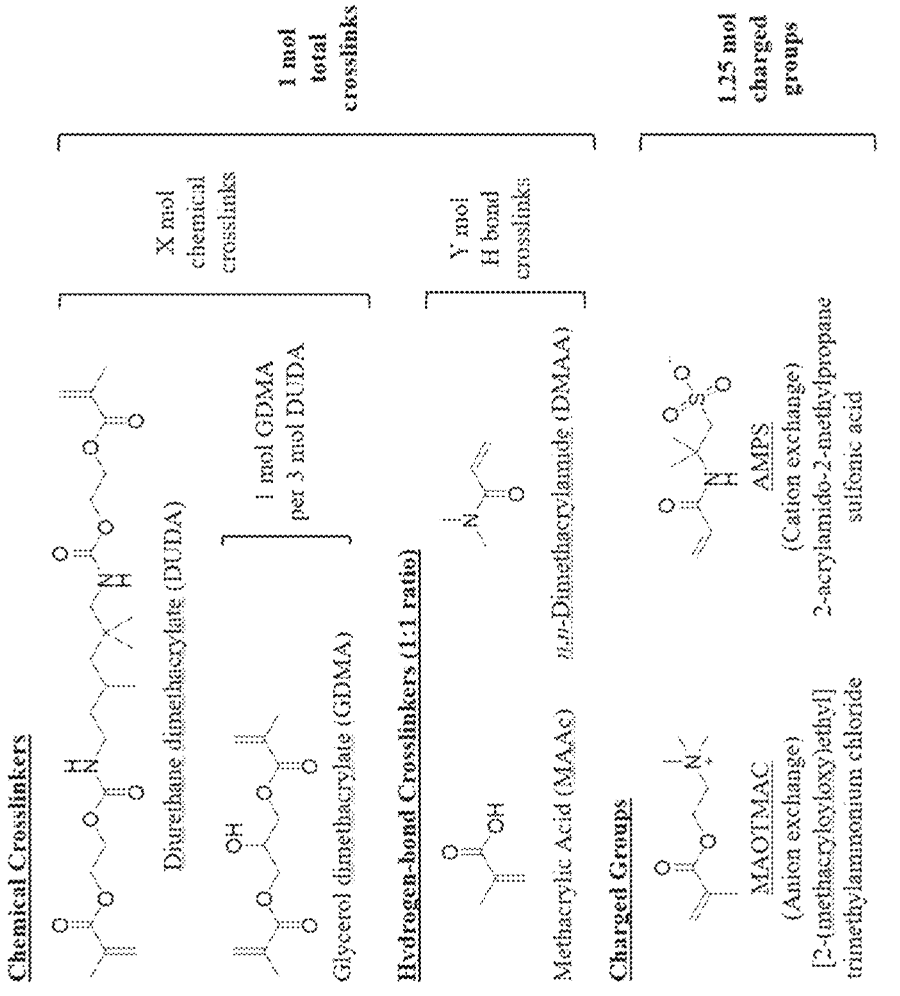
FIG. 1 shows a representative diagram illustrating exemplary recipes for a series of anion exchange membranes (AEMs) and cation exchange membranes (CEMs).

Additional advantages of the invention will be set forth in part in the description that follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Further, the dates of publication provided herein may be different from the actual publication dates, which can require independent confirmation.

A. Definitions

The present invention now will be described more fully hereinafter with reference to the accompanying drawings, in which illustrative aspects of the invention are shown. In the drawings, the relative sizes of regions or features may be exaggerated for clarity. This invention may, however, be embodied in many different forms and should not be construed as limited to the aspects set forth herein; rather, these aspects are provided so that this disclosure will be thorough and complete, and will fully convey the scope of the invention to those skilled in the art.

The disclosures of all patent references cited herein are hereby incorporated by reference to the extent they are consistent with the disclosure set forth herein. As used herein in the description of the invention and the appended claims, the singular forms "a," "an," and "the" are intended to include the plural forms as well, unless the context clearly indicates otherwise.

As used in the specification and in the claims, the term "comprising" can include the aspects "consisting of" and "consisting essentially of."

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular aspects only and is not intended to be limiting of the invention. All publications, patent applications, patents and other references mentioned herein are incorporated by reference in their entirety. In case of a conflict in terminology, the present specification is controlling.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in various aspects of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

References to parts by weight of a particular component in a composition, whether in the specification or subsequent claims, expresses the weight relationship between the component and any other components in the composition or article for which a part by weight is described. For example, in a composition containing 1 part by weight of component A and 2 parts by weight component B, A and B are present in a weight ratio of 1:2 and exist in this ratio regardless of whether additional components are present in the composition.

A weight percent (wt. % or wt %) of a component, unless stated specifically to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

As used herein, "polymer network" refers to a polymer in which covalent or non-covalent (dynamic) cross-linking has occurred. Examples of polymer networks include, but are not limited to, polymer gels and elastomers.

B. Polymer Networks

In one aspect, disclosed are polymer network comprising: (a) a plurality of polymer backbones formed by co-polymerization of: (i) a first monomer having a hydrogen bond donor end group; (ii) a second monomer having a hydrogen bond acceptor end group; (iii) a third monomer having a positively charged or negatively charged end group; and (iv) a crosslinker; (b) a plurality of covalent crosslinks between the plurality of polymer backbones; (c) a plurality of reversible, non-covalent crosslinks between the plurality of polymer backbones; and (d) a plurality of ionic side groups pendant from the plurality of polymer backbones.

In another aspect, disclosed are polymer network comprising: (a) a plurality of polymer backbones formed by co-polymerization of: (i) a first monomer having a hydrogen bond donor end group; or a first monomer having a hydrogen bond acceptor end group; (ii) a second monomer having a positively charged or negatively charged end group; and (iii) a crosslinker; (b) a plurality of covalent crosslinks between the plurality of polymer backbones; (c) a plurality of reversible, non-covalent crosslinks between the plurality of polymer backbones; and (d) a plurality of ionic side groups pendant from the plurality of polymer backbones. In certain embodiments, the polymer network can further comprise a third monomer serving as a chain extender.

In another aspect, disclosed are polymer network comprising: (a) a plurality of polymer backbones formed by co-polymerization of: (i) a first monomer having a hydrogen bond donor end group; (ii) a second monomer having a hydrogen bond acceptor end group; (iii) a third monomer having a positively charged or negatively charged end group; and (iv) a crosslinker; (b) a plurality of covalent crosslinks between the plurality of polymer backbones; (c) a plurality of reversible, non-covalent crosslinks between the plurality of polymer backbones; and (d) a plurality of ionic side groups pendant from the plurality of polymer backbones. In certain embodiments, the polymer network can further comprise a fourth monomer serving as a chain extender.

In various aspects, the first monomer has a hydrogen bond donor end group. Examples of first monomers include, but are not limited to, vinyl, acrylate, or methacrylate monomers containing a hydrogen atom bonded to an electronegative atom such as oxygen, nitrogen, or fluorine, e.g., hydroxides, carboxylic acids, amides, and amines. In a further aspect, the first monomer is a methacrylic acid (MAAc) monomer.

In various aspects, the second monomer has a hydrogen bond acceptor end group. Examples of second monomers include, but are not limited to, acrylamides, ethers, or carbonyls. In a further aspect, the second monomer is a n,n-dimethacrylamide (DMAA) monomer. In an additional aspect, the second monomer is identical to the first monomer, wherein the same functional group serves as both a hydrogen bond donor and hydrogen bond acceptor (e.g., methacrylic acid monomer). For example, in methacrylic acid, the oxygen has a partial negative charge, making it a donor, while the adjacent —OH group has a partial positive charge, making it an acceptor.

In various aspects, each of the first monomer and the second monomer, and chain extender (if present) are monoacrylates. These monomers that are monofunctional, such that the monomer will integrate into the polymer chain but not crosslink between chains.

In various aspects, the ratio of the first monomer to the second monomer is about 0.1:1, about 0.2:1, about 0.3:1, about 0.4:1, about 0.5:1, about 0.6:1, about 0.7:1, about 0.8:1, about 0.9:1, about 1:1, about 1:0.9, about 1:0.8, about 1:0.7, about 1:0.6, about 1:0.5, about 1:0.4, about 1:0.3, about 1:0.2, or about 1:0.1. In a further aspect, the ratio of the first monomer to the second monomer is about 1:1.

In various aspects, the first monomer and the second monomer together are present in an amount of from about 1 wt % to about 50 wt %, about 1 wt % to about 40 wt %, about 1 wt % to about 30 wt %, about 1 wt % to about 25 wt %, about 1 wt % to about 20 wt %, about 1 wt % to about 15 wt %, about 1 wt % to about 10 wt %, about 1 wt % to about 5 wt %, about 5 wt % to about 50 wt %, about 10 wt % to about 50 wt %, about 15 wt % to about 50 wt %, about 20 wt % to about 50 wt %, about 25 wt % to about 50 wt %, about 30 wt % to about 50 wt %, or about 40 wt % to about 50 wt %. In a further aspect, the first monomer and the second monomer together are present in an amount of from about 1 wt % to about 25 wt %.

In various aspects, the first monomer and the second monomer together are present in an amount of from about 0.01% to about 67%, on a molar fraction basis. In a further aspect, the first monomer and the second monomer together are present in an amount of from about 0.01% to about 60%, on a molar fraction basis. In a still further aspect, the first monomer and the second monomer together are present in an amount of from about 0.01% to about 50%, on a molar fraction basis. In yet a further aspect, the first monomer and the second monomer together are present in an amount of from about 0.01% to about 40%, on a molar fraction basis. In an even further aspect, the first monomer and the second monomer together are present in an amount of from about 0.01% to about 20%, on a molar fraction basis. In a still further aspect, the first monomer and the second monomer together are present in an amount of from about 0.01% to about 10%, on a molar fraction basis. In yet a further aspect, the first monomer and the second monomer together are present in an amount of from about 1% to about 67%, on a molar fraction basis. In an even further aspect, the first monomer and the second monomer together are present in an amount of from about 10% to about 67%, on a molar fraction basis. In a still further aspect, the first monomer and the second monomer together are present in an amount of from about 20% to about 67%, on a molar fraction basis. In yet a further aspect, the first monomer and the second monomer together are present in an amount of from about 40% to about 67%, on a molar fraction basis.

In various aspects, the third monomer has a positively-charged or negatively-charged end group. In a further aspect, the third monomer has a positively-charged end group. In a still further aspect, the third monomer has a negatively-charged end group. Examples of third monomers include, but are not limited to, any monomer with the structure A-xx-B, where A is an acrylate or methacrylate group, and B is a tertiary ammonium, quaternary ammonium, imidazolinium, phosphonium, sulfonic acid, carboxylic acid, or another functional group bearing a strong positive or negative charge. As used herein, "xx" represents any chemical structure connecting an acrylate group A with the tertiary ammonium group B. In yet a further aspect, the third monomer is a 2-acrylamido-2-methylpropane sulfonic acid (AMPS) monomer or a [2-(methacryloxyloxy)ethyl] trimethylammonium chloride (MAOTMAC) monomer.

In various aspects, the first monomer is a MAAc monomer, the second monomer is a DMAA monomer, and the third monomer is an AMPS monomer or a MAOTMAC monomer.

Examples of crosslinkers include, but are not limited to, difunctional aliphatic monomers, aromatic monomers, ureas, urethanes, and glycols, where "difunctional" means that the monomer chain is terminated with two vinyl, acrylate, or methacrylate groups. In a further aspect, the crosslinker is a diacrylate or a dimethacrylate. Examples of diacrylates and dimethacrylates include, but are not limited to, 1-(acryloyloxy)-3-(methacryloxyloxy)-2-propanol, 1,3-butanediol dimethacrylate, bis(4-methacryloylthiophenyl) sulfide, 1,6-bis(acryloyloxy)-2,2,3,3,4,4,5,5-octafluorohexane, 1,9-bis(acryloyloxy)nonane, 1,4-bis(acryloyloxy) butane, 1,6-bis(acryloyloxy)hexane, 1,10-bis(acryloyloxy) decane, glycerol dimethacrylate, 1,6-bis(acryloyloxy)-2,2,3,3,4,4,5,5-octafluorohexane, diethylene glycol dimethacrylate, dipropylene glycol diacrylate, 1,12-dodecanediol dimethacrylate, diethylene glycol diacrylate, ethylene glycol dimethacrylate, 1,6-hexanediol dimethacrylate, 4,4'-isopropylidenediphenol dimethacrylate, neopentyl glycol dimethacrylate, neopentyl glycol diacrylate, nonamethylene glycol dimethacrylate, pentaerythritol tetraacrylate, polyethylene glycol diacrylate, polyethylene glycol dimethacrylate, trimethylolpropane trimethacrylate, triethylene glycol dimethacrylate, trimethylolpropane triacrylate, polyethylene glycol dimethacrylate, tetraethylene glycol diacrylate, tris(2-acryloyloxyethyl) isocyanurate, tripropylene glycol diacrylate, tetraethylene glycol dimethacrylate, and tetramethylene glycol dimethacrylate. In a still further aspect, the crosslinker is poly(ethylene glycol) diacrylate (PEGDA). In yet a further aspect, the crosslinker is selected from diurethane dimethacrylate (DUDA) and glycerol dimethacrylate (GDMA), or a combination thereof.

In various aspects, the chain extender is a monoacrylate lacking any hydrogen bond donor or acceptor moieties. A non-limiting example is methylmethacrylate.

In various aspects, the crosslinker is a combination of DUDA and GDMA, and wherein the ratio of DUDA to GDMA is about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, or about 1:10. In a further aspect, the ratio of DUDA to GDMA is about 3:1.

In various aspects, the molar ratio of the crosslinker to the third monomer is from about 0.5:1 to about 2:1, about 0.5:1 to about 1.5:1, about 0.5:1 to about 1:1, about 1:1 to about 2:1, or about 1.5:1 to about 2:1. In a further aspect, the molar ratio of the crosslinker to the third monomer is from about 0.5:1 to about 2:1.

In various aspects, the molar ratio of the first and second monomer, combined, to the third monomer is from about 0.5:1 to about 1.5:1, about 0.5:1 to about 1.25:1, about 0.5:1 to about 1:1, about 0.75:1 to about 1.5:1, or about 1:1 to about 1.5:1. In a further aspect, the molar ratio of the first and second monomer, combined, to the third monomer is from about 0.5:1 to about 1.5:1.

In various aspects, co-polymerization is in the presence of an initiator. Examples of initiators include, but are not limited to, Irgacure 2959, acetophenone, 3'-hydroxyacetophenone, anthraquinone, sodium anthraquinone 2-sulfonate monohydrate, anisoin, p-anisil, benzyl, benzoin, benzophenone, 2-benzoylbenzoic acid, 4,4'-bis(diethylamino)benzophenone, 4,4'-bis(dimethylamino)benzophenone, benzoin methyl ether, benzoin isopropyl ether, 3,3',4,4'-benzophenonetetracarboxylic dianhydride, benzoin isobutyl ether, benzoin ethyl ther, methyl benzoylformate, 4-benzoylbenzoic acid, 2,2'-bis(2-chlorophenyl)-4,4',5,5'-tetraphenyl-1,2'-biimidazole, methyl 2-benzoylbenzoate, 2-(1,3-benzodioxol-5-yl)-4,6-bis(trichloromethyl)-1,3,5-triazine, 2-benzyl-2-(dimethylamino)-4'-morpholinobutyophenone, (±)-camphorquinone, 2-chlorothioxanthone, ferrocene, 4,4'-dihydroxybenzophenone, 4,4'-dichlorobenzophenone, 2,2-dietoxyacetophenone, 2,2-dimethoxy-2-phenylacetophenone, dibenzosuberenone, 4,4'-dimethylbenzil, 2,4-diethylthioxanthen-9-one, 4-(dimethylamino)benzophenone, 3,4-dimethylbenzophenone, diphenyl(2,4,6-trimethylbenzoyl)phosphine oxide, 1,4-dibenzoylbenzene, 2-ethylanthraquinone, 4'-hydroxyacetophenone, 4-hydroxybenzophenone, 1-hydroxycyclohexyl phenyl ketone, 2-hydroxy-2-methylpropiophenone, 2-hydroxy-4'-(2-hydroxyethoxy)-2-methylpropiophenone, 3-hydroxybenzophenone, 2-isopropylthioxanthone, lithium phenyl(2,4,6-trimethylbenzoyl) phosphinate, 2-methylbenzophenone, 3-methylbenzophenone, 2-methyl-4'-(methylthio)-2-morpholinopropiophenone, 9,10-phenanthrenequinone, 2-isonitrosopropiophenone, 4-phenylbenzophenone, 9,10-phenanthrenequinone, 2-phenyl-2-(p-toluenesulfonyloxy)acetophenone, and phenylbis(2,4,6-trimethylbenzoyl)phosphine oxide. In a further aspect, the initiator is Irgacure 2959.

In various aspects, the initiator is present in an amount of from about 0.01 wt % to about 1.0 wt %, about 0.05 wt % to about 1.0 wt %, about 0.1 wt % to about 1.0 wt %, about 0.5 wt % to about 1.0 wt %, about 0.01 wt % to about 0.5 wt %, about 0.01 wt % to about 0.1 wt %, or about 0.01 wt % to about 0.05 wt %. In a further aspect, the initiator is present in an amount of from about 0.01 wt % to about 1.0 wt %.

In various aspects, the initiator is present in an amount of about 1 wt % or less, about 0.75 wt % or less, about 0.5 wt % or less, about 0.25 wt % or less, about 0.1 wt % or less, about 0.05 wt % or less, or about 0.01 wt % or less. In a further aspect, the initiator is present in an amount of about 0.1 wt % or less.

In various aspects, co-polymerization is via ultraviolet (UV) crosslinking. In certain embodiments, the wavelength of UV light is between 300 and 325 nm. In certain embodiments, the wavelength is about 300 nm, 301 nm, 302 nm, 303 nm, 304 nm, 305 nm, 306 nm, 307 nm, 308 nm, 309 nm, 310 nm, 311 nm, 312 nm, 313 nm, 314 nm, 315 nm, 316 nm, 317 nm, 318 nm, 319 nm, 320 nm, 321 nm, 322 nm, 323 nm, 324 nm, or 315 nm.

In various aspects, the polymer network has a conductivity of from about 3.0 mS/cm to about 15.0 mS/cm, about 3.0 mS/cm to about 12.0 mS/cm, about 3.0 mS/cm to about 9.0 mS/cm, about 3.0 mS/cm to about 6.0 mS/cm, about 6.0 mS/cm to about 15.0 mS/cm, about 9.0 mS/cm to about 15.0 mS/cm, or about 12.0 mS/cm to about 15.0 mS/cm. In a further aspect, the polymer network has a conductivity of from about 3.0 mS/cm to about 15.0 mS/cm.

In various aspects, the polymer network has a permselectivity, defined as the ratio of the obtained electric potential across the membrane when placed between solutions of 0.5 mol/L and 0.1 mol/L sodium chloride to the potential across a perfectly-selective membrane. This value can be calculated from the Nernst equation as 37.8 mV at 25 degrees C. In certain embodiments, the polymer network has a permselectivity of from about 70% to about 99%, about 70% to about 95%, about 70% to about 90%, about 70% to about 85%, about 70% to about 80%, about 70% to about 75%, about 75% to about 99%, about 80% to about 99%, about 85% to about 99%, about 90% to about 99%, or about 95% to about 99%. In a further aspect, the polymer network has a permselectivity of from about 70% to about 99%.

In various aspects, the polymer network has a conductivity of from about 3.0 mS/cm to about 15.0 mS/cm and a permselectivity of at least about 70%.

In various aspects, the polymer network has a conductivity of from about 6.0 mS/cm to about 15.0 mS/cm and a permselectivity of from about 85% to about 99%.

Figure 15:
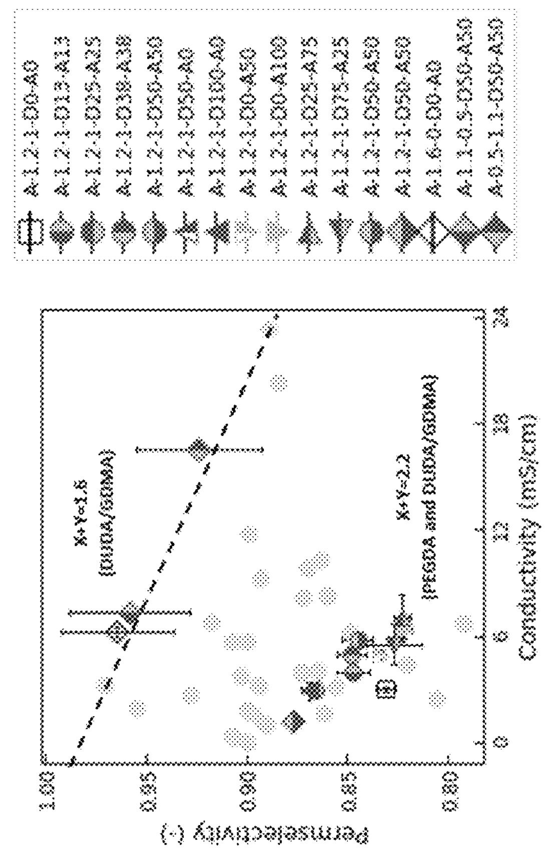
FIG. 15 shows permselectivity vs. conductivity for certain anion exchange membranes disclosed herein (empty and colored symbols) compared to that of commercial and lab-synthesized AEMs reported in literature (light gray circles). Error bars represent the standard error of three to five replicate measurements. The dashed line represents the approximate performance frontier of conventional IEMs without hydrogen bond enrichment.

Referring now to the dashed line in FIG. 15, the dashed line represents the approximate performance frontier of conventional IEMs without hydrogen bond enrichment. As described herein, the polymer networks are synthesized such that the hydrogen donor or hydrogen acceptor functionality are still available after synthesis of the polymer network. This is achieved by the purposeful addition of monomers that do not covalently crosslink. In certain embodiments, the polymer networks are capable of a 6-15 mS/cm conductivity and a permselectivity of about 85-99%.

C. Methods of Making Polymer Networks

In one aspect, disclosed are methods for making a disclosed polymer network. Thus, in various aspects, disclosed are methods for making a polymer network, the method comprising co-polymerizing: (a) a first monomer having a hydrogen bond donor end group; (b) a second monomer having a hydrogen bond acceptor end group; (c) a third monomer having a positively- or negatively-charged end group; and (d) a crosslinker, wherein the polymer network comprises a plurality of polymer backbones, a plurality of covalent crosslinks between the plurality of polymer backbones, a plurality of reversible, non-covalent crosslinks between the plurality of polymer backbones, and a plurality of ionic side groups pendant from the plurality of polymer backbones. In a further aspect, the disclosed polymer network is prepared via a disclosed method.

In another aspect, disclosed are methods for making a polymer network, the method comprising co-polymerizing: (a) a first monomer having a hydrogen bond donor end group; (b) a second monomer having a hydrogen bond acceptor end group; (c) a third monomer having a positively- or negatively-charged end group; and (d) a crosslinker, wherein the polymer network comprises a plurality of polymer backbones, a plurality of covalent crosslinks between the plurality of polymer backbones, a plurality of reversible, non-covalent crosslinks between the plurality of polymer backbones, and a plurality of ionic side groups pendant from the plurality of polymer backbones. In certain embodiments of the methods described herein, the polymer network can further comprise a fourth monomer serving as a chain extender.

In another aspect, disclosed are methods for making a polymer network, the method comprising co-polymerizing: (a) a first monomer having a hydrogen bond donor end group or a hydrogen bond acceptor end group; (b) a second monomer having a positively- or negatively-charged end group; and (c) a crosslinker, wherein the polymer network comprises a plurality of polymer backbones, a plurality of covalent crosslinks between the plurality of polymer backbones, a plurality of reversible, non-covalent crosslinks between the plurality of polymer backbones, and a plurality of ionic side groups pendant from the plurality of polymer backbones. In certain embodiments of the methods described herein, the polymer network can further comprise a third monomer serving as a chain extender.

In various aspects, the first monomer has a hydrogen bond donor end group. Examples of first monomers include, but are not limited to, vinyl, acrylate, or methacrylate monomers containing a hydrogen atom bonded to an electronegative atom such as oxygen, nitrogen, e.g., hydroxides, carboxylic acids, amides, and amines. In a further aspect, the first monomer is a methacrylic acid (MAAc) monomer.

In various aspects, the second monomer has a hydrogen bond acceptor end group. Examples of second monomers include, but are not limited to, acrylamides. In a further aspect, the second monomer is a n,n-dimethacrylamide (DMAA) monomer.

In various aspects, each of the first monomer and the second monomer are monoacrylates.

In various aspects, the ratio of the first monomer to the second monomer is about 0.1:1, about 0.2:1, about 0.3:1, about 0.4:1, about 0.5:1, about 0.6:1, about 0.7:1, about 0.8:1, about 0.9:1, about 1:1, about 1:0.9, about 1:0.8, about 1:0.7, about 1:0.6, about 1:0.5, about 1:0.4, about 1:0.3, about 1:0.2, or about 1:0.1. In a further aspect, the ratio of the first monomer to the second monomer is about 1:1.

In various aspects, the first monomer and the second monomer together are present in an amount of from about 1 wt % to about 50 wt %, about 1 wt % to about 40 wt %, about 1 wt % to about 30 wt %, about 1 wt % to about 25 wt %, about 1 wt % to about 20 wt %, about 1 wt % to about 15 wt %, about 1 wt % to about 10 wt %, about 1 wt % to about 5 wt %, about 5 wt % to about 50 wt %, about 10 wt % to about 50 wt %, about 15 wt % to about 50 wt %, about 20 wt % to about 50 wt %, about 25 wt % to about 50 wt %, about 30 wt % to about 50 wt %, or about 40 wt % to about 50 wt %. In a further aspect, the first monomer and the second monomer together are present in an amount of from about 1 wt % to about 25 wt %.

In various aspects, the first monomer and the second monomer together are present in an amount of from about 0.01% to about 67%, on a molar fraction basis. In a further aspect, the first monomer and the second monomer together are present in an amount of from about 0.01% to about 60%, on a molar fraction basis. In a still further aspect, the first monomer and the second monomer together are present in an amount of from about 0.01% to about 50%, on a molar fraction basis. In yet a further aspect, the first monomer and the second monomer together are present in an amount of from about 0.01% to about 40%, on a molar fraction basis. In an even further aspect, the first monomer and the second monomer together are present in an amount of from about 0.01% to about 20%, on a molar fraction basis. In a still further aspect, the first monomer and the second monomer together are present in an amount of from about 0.01% to about 10%, on a molar fraction basis. In yet a further aspect, the first monomer and the second monomer together are present in an amount of from about 1% to about 67%, on a molar fraction basis. In an even further aspect, the first monomer and the second monomer together are present in an amount of from about 10% to about 67%, on a molar fraction basis. In a still further aspect, the first monomer and the second monomer together are present in an amount of from about 20% to about 67%, on a molar fraction basis. In yet a further aspect, the first monomer and the second monomer together are present in an amount of from about 40% to about 67%, on a molar fraction basis.

In various aspects, the third monomer has a positively-charged or negatively-charged end group. In a further aspect, the third monomer has a positively-charged end group. In a still further aspect, the third monomer has a negatively-charged end group. Examples of third monomers include, but are not limited to, any monomer with the structure A-xx-B, where A is an acrylate or methacrylate group, and B is a tertiary ammonium, quaternary ammonium, imidazolinium, phosphonium, sulfonic acid, carboxylic acid, or another functional group bearing a strong positive or negative charge. In yet a further aspect, the third monomer is a 2-acrylamido-2-methylpropane sulfonic acid (AMPS) monomer or a [2-(methacryloxyloxy)ethyl] trimethylammonium chloride (MAOTMAC) monomer.

In various aspects, the first monomer is a MAAc monomer, the second monomer is a DMAA monomer, and the third monomer is an AMPS monomer or a MAOTMAC monomer.

Examples of crosslinkers include, but are not limited to, difunctional aliphatic monomers, aromatic monomers, ureas, urethanes, and glycols, where "difunctional" means that the monomer chain is terminated with two vinyl, acrylate, or methacrylate groups. In a further aspect, the crosslinker is a diacrylate or a dimethacrylate. Examples of diacrylates and dimethacrylates include, but are not limited to, 1-(acryloyloxy)-3-(methacryloxyloxy)-2-propanol, 1,3-butanediol dimethacrylate, bis(4-methacryloylthiophenyl) sulfide, 1,6-bis(acryloyloxy)-2,2,3,3,4,4,5,5-octafluorohexane, 1,9-bis(acryloyloxy)nonane, 1,4-bis(acryloyloxy) butane, 1,6-bis(acryloyloxy)hexane, 1,10-bis(acryloyloxy) decane, glycerol dimethacrylate, 1,6-bis(acryloyloxy)-2,2,3,3,4,4,5,5-octafluorohexane, diethylene glycol dimethacrylate, dipropylene glycol diacrylate, 1,12-dodecanediol dimethacrylate, diethylene glycol diacrylate, ethylene glycol dimethacrylate, 1,6-hexanediol dimethacrylate, 4,4'-isopropylidenediphenol dimethacrylate, neopentyl glycol dimethacrylate, neopentyl glycol diacrylate, nonamethylene glycol dimethacrylate, pentaerythritol tetraacrylate, polyethylene glycol diacrylate, polyethylene glycol dimethacrylate, trimethylolpropane trimethacrylate, triethylene glycol dimethacrylate, trimethylolpropane triacrylate, polyethylene glycol dimethacrylate, tetraethylene glycol diacrylate, tris(2-acryloyloxyethyl) isocyanurate, tripropylene glycol diacrylate, tetraethylene glycol dimethacrylate, and tetramethylene glycol dimethacrylate. In a still further aspect, the crosslinker is poly(ethylene glycol) diacrylate (PEGDA). In yet a further aspect, the crosslinker is selected from diurethane dimethacrylate (DUDA) and glycerol dimethacrylate (GDMA), or a combination thereof.

In various aspects, the crosslinker is a combination of DUDA and GDMA, and wherein the ratio of DUDA to GDMA is about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, or about 1:10. In a further aspect, the ratio of DUDA to GDMA is about 3:1.

In various aspects, the molar ratio of the crosslinker to the third monomer is from about 0.5:1 to about 2:1, about 0.5:1 to about 1.5:1, about 0.5:1 to about 1:1, about 1:1 to about 2:1, or about 1.5:1 to about 2:1. In a further aspect, the molar ratio of the crosslinker to the third monomer is from about 0.5:1 to about 2:1.

In various aspects, the molar ratio of the first and second monomer, combined, to the third monomer is from about 0.5:1 to about 1.5:1, about 0.5:1 to about 1.25:1, about 0.5:1 to about 1:1, about 0.75:1 to about 1.5:1, or about 1:1 to about 1.5:1. In a further aspect, the molar ratio of the first and second monomer, combined, to the third monomer is from about 0.5:1 to about 1.5:1.

In certain embodiments, the molar ratio of the chain extender to the first and second monomer is about 0.25:1, about 0.5:1, about 0.75:1, about 0:1, about 1:0.25, about 1:0.5, or about 1:0.75.

In various aspects, co-polymerizing is in the presence of an initiator. Examples of initiators include, but are not limited to, Irgacure 2959, acetophenone, 3'-hydroxyacetophenone, anthraquinone, sodium anthraquinone 2-sulfonate monohydrate, anisoin, p-anisil, benzyl, benzoin, benzophenone, 2-benzoylbenzoic acid, 4,4'-bis(diethylamino)benzophenone, 4,4'-bis(dimethylamino)benzophenone, benzoin methyl ether, benzoin isopropyl ether, 3,3',4,4'-benzophenonetetracarboxylic dianhydride, benzoin isobutyl ether, benzoin ethyl ther, methyl benzoylformate, 4-benzoylbenzoic acid, 2,2'-bis(2-chlorophenyl)-4,4',5,5'-tetraphenyl-1,2'-biimidazole, methyl 2-benzoylbenzoate, 2-(1,3-benzodioxol-5-yl)-4,6-bis(trichloromethyl)-1,3,5-triazine, 2-benzyl-2-(dimethylamino)-4'-morpholinobutyophenone, (±)-camphorquinone, 2-chlorothioxanthone, ferrocene, 4,4'-dihydroxybenzophenone, 4,4'-dichlorobenzophenone, 2,2-dietoxyacetophenone, 2,2-dimethoxy-2-phenylacetophenone, dibenzosuberenone, 4,4'-dimethylbenzil, 2,4-diethylthioxanthen-9-one, 4-(dimethylamino)benzophenone, 3,4-dimethylbenzophenone, diphenyl(2,4,6-trimethylbenzoyl)phosphine oxide, 1,4-dibenzoylbenzene, 2-ethylanthraquinone, 4'-hydroxyacetophenone, 4-hydroxybenzophenone, 1-hydroxycyclohexyl phenyl ketone, 2-hydroxy-2-methylpropiophenone, 2-hydroxy-4'-(2-hydroxyethoxy)-2-methylpropiophenone, 3-hydroxybenzophenone, 2-isopropylthioxanthone, lithium phenyl(2,4,6-trimethylbenzoyl) phosphinate, 2-methylbenzophenone, 3-methylbenzophenone, 2-methyl-4'-(methylthio)-2-morpholinopropiophenone, 9,10-phenanthrenequinone, 2-isonitrosopropiophenone, 4-phenylbenzophenone, 9,10-phenanthrenequinone, 2-phenyl-2-(p-toluenesulfonyloxy)acetophenone, and phenylbis(2,4,6-trimethylbenzoyl)phosphine oxide. In a further aspect, the initiator is Irgacure 2959.

In various aspects, the initiator is present in an amount of from about 0.01 wt % to about 1.0 wt %, about 0.05 wt % to about 1.0 wt %, about 0.1 wt % to about 1.0 wt %, about 0.5 wt % to about 1.0 wt %, about 0.01 wt % to about 0.5 wt %, about 0.01 wt % to about 0.1 wt %, or about 0.01 wt % to about 0.05 wt %. In a further aspect, the initiator is present in an amount of from about 0.01 wt % to about 1.0 wt %.

In various aspects, the initiator is present in an amount of about 1 wt % or less, about 0.75 wt % or less, about 0.5 wt % or less, about 0.25 wt % or less, about 0.1 wt % or less, about 0.05 wt % or less, or about 0.01 wt % or less. In a further aspect, the initiator is present in an amount of about 0.1 wt % or less.

In various aspects, co-polymerizing is via ultraviolet (UV) crosslinking.

D. Articles Comprising Polymer Networks

In one aspect, disclosed are articles comprising a disclosed polymer network, wherein the article is selected from a polymer film and a polymer coating. Thus, in various aspects, the article comprises a polymer network comprising: (a) a plurality of polymer backbones formed by co-polymerization of: (i) a first monomer having a hydrogen bond donor end group; and/or a second monomer having a hydrogen bond acceptor end group; (iii) a third monomer having a positively charged or negatively charged end group; and (iv) a crosslinker; (b) a plurality of covalent crosslinks between the plurality of polymer backbones; (c) a plurality of reversible, non-covalent crosslinks between the plurality of polymer backbones; and (d) a plurality of ionic side groups pendant from the plurality of polymer backbones. In certain embodiments, the polymer network can comprise another monomer serving as a chain extender.

In a further aspect, the article is a polymer film. Thus, in various aspects, disclosed are polymer films comprising a disclosed polymer network.

In various aspects, the polymer film is formed on a glass substrate. Typically, ultraviolet (UV) crosslinking is performed through quartz, which is expensive, because glass absorbs UV light. However, under the conditions disclosed herein, the selection of an initiator (e.g., Irgacure 2959) in combination with a UV lamp allows for UV crosslinking to be performed through glass. Examples of glass substrates include, but are not limited to, a glass plate, a glass plate treated with a silane coupling agent (e.g., Rain-X) to make its surface hydrophobic and prevent the membranes from sticking, a borosilicate glass plate, a “sandwich” of two of the glass plates described above, wherein the glass plates are separated by metal spacers and clamped together, wherein the polymer network is formed inside the space between the glass plates.

In another aspect, the article is a freestanding membrane without a support.

In certain embodiments, the polymer film can be incorporated into a support material by being embedded within the active polymer. In additional embodiments, the film can also be a distinct support layer.

In certain embodiments, the membranes described herein can be used as a coating to improve the performance of a pre-existing material or membrane.

In various aspects, the polymer film has a conductivity of from about 3.0 mS/cm to about 15.0 mS/cm, about 3.0 mS/cm to about 12.0 mS/cm, about 3.0 mS/cm to about 9.0 mS/cm, about 3.0 mS/cm to about 6.0 mS/cm, about 6.0 mS/cm to about 15.0 mS/cm, about 9.0 mS/cm to about 15.0 mS/cm, or about 12.0 mS/cm to about 15.0 mS/cm. In a further aspect, the polymer film has a conductivity of from about 3.0 mS/cm to about 15.0 mS/cm.

In various aspects, the polymer film has a permselectivity of from about 70% to about 99%, about 70% to about 95%, about 70% to about 90%, about 70% to about 85%, about 70% to about 80%, about 70% to about 75%, about 75% to about 99%, about 80% to about 99%, about 85% to about 99%, about 90% to about 99%, or about 95% to about 99%. In a further aspect, the polymer film has a permselectivity of from about 70% to about 99%.

In various aspects, the polymer film has a conductivity of from about 3.0 mS/cm to about 15.0 mS/cm and a permselectivity of at least about 70%.

In various aspects, the polymer film has a conductivity of from about 6.0 mS/cm to about 15.0 mS/cm and a permselectivity of from about 85% to about 99%.

In various aspects, the polymer film has a modulus of from about 10 MPa to about 250 MPa, about 10 MPa to about 225 MPa, about 10 MPa to about 200 MPa, about 10 MPa to about 175 MPa, about 10 MPa to about 150 MPa, about 10 MPa to about 125 MPa, about 10 MPa to about 100 MPa, about 10 MPa to about 75 MPa, about 10 MPa to about 50 MPa, about 10 MPa to about 25 MPa, about 25 MPa to about 250 MPa, about 50 MPa to about 250 MPa, about 75 MPa to about 250 MPa, about 100 MPa to about 250 MPa, about 125 MPa to about 250 MPa, about 150 MPa to about 250 MPa, about 175 MPa to about 250 MPa, about 200 MPa to about 250 MPa, about 225 MPa to about 250 MPa, about 25 MPa to about 225 MPa, about 50 MPa to about 200 MPa, about 75 MPa to about 175 MPa, or about 100 MPa to about 150 MPa.

In various aspects, the polymer film has a water uptake/swelling degree of from about 20% to about 150%, about 20% to about 125%, about 20% to about 100%, about 20% to about 75%, about 20% to about 50%, about 50% to about 150%, about 75% to about 150%, about 100% to about 150%, about 125% to about 150%, about 50% to about 125%, or about 75% to about 100%.

In a further aspect, the article is a polymer coating. Thus, in various aspects, disclosed are polymer coatings comprising a disclosed polymer network.

In various aspects, the polymer coating is formed on a glass substrate. Examples of glass substrates include, but are not limited to, a glass plate, a glass plate treated with a silane coupling agent (e.g., Rain-X) to make its surface hydrophobic and prevent the membranes from sticking, a borosilicate glass plate, a “sandwich” of two of the glass plates described above, wherein the glass plates are separated by metal spacers and clamped together, wherein the polymer network is formed inside the space between the glass plates.

In various aspects, the polymer coating has a conductivity of from about 3.0 mS/cm to about 15.0 mS/cm, about 3.0 mS/cm to about 12.0 mS/cm, about 3.0 mS/cm to about 9.0 mS/cm, about 3.0 mS/cm to about 6.0 mS/cm, about 6.0 mS/cm to about 15.0 mS/cm, about 9.0 mS/cm to about 15.0 mS/cm, or about 12.0 mS/cm to about 15.0 mS/cm. In a further aspect, the polymer coating has a conductivity of from about 3.0 mS/cm to about 15.0 mS/cm.

In various aspects, the polymer coating has a permselectivity of from about 70% to about 99%, about 70% to about 95%, about 70% to about 90%, about 70% to about 85%, about 70% to about 80%, about 70% to about 75%, about 75% to about 99%, about 80% to about 99%, about 85% to about 99%, about 90% to about 99%, or about 95% to about 99%. In a further aspect, the polymer coating has a permselectivity of from about 70% to about 99%.

In various aspects, the polymer coating has a conductivity of from about 3.0 mS/cm to about 15.0 mS/cm and a permselectivity of at least about 70%.

In various aspects, the polymer coating has a conductivity of from about 6.0 mS/cm to about 15.0 mS/cm and a permselectivity of from about 85% to about 99%.

In various aspects, the polymer coating has a modulus of from about 10 MPa to about 250 MPa, about 10 MPa to about 225 MPa, about 10 MPa to about 200 MPa, about 10 MPa to about 175 MPa, about 10 MPa to about 150 MPa, about 10 MPa to about 125 MPa, about 10 MPa to about 100 MPa, about 10 MPa to about 75 MPa, about 10 MPa to about 50 MPa, about 10 MPa to about 25 MPa, about 25 MPa to about 250 MPa, about 50 MPa to about 250 MPa, about 75 MPa to about 250 MPa, about 100 MPa to about 250 MPa, about 125 MPa to about 250 MPa, about 150 MPa to about 250 MPa, about 175 MPa to about 250 MPa, about 200 MPa to about 250 MPa, about 225 MPa to about 250 MPa, about 25 MPa to about 225 MPa, about 50 MPa to about 200 MPa, about 75 MPa to about 175 MPa, or about 100 MPa to about 150 MPa.

In various aspects, the polymer coating has a water uptake/swelling degree of from about 20% to about 150%, about 20% to about 125%, about 20% to about 100%, about 20% to about 75%, about 20% to about 50%, about 50% to about 150%, about 75% to about 150%, about 100% to about 150%, about 125% to about 150%, about 50% to about 125%, or about 75% to about 100%.

E. Membranes

In one aspect, disclosed are membranes having a support and a polymer layer comprising a disclosed polymer network. Thus, in various aspects, disclosed are membranes having a support and a polymer layer comprising a polymer network comprising: (a) a plurality of polymer backbones formed by co-polymerization of: (i) a first monomer having a hydrogen bond donor end group and/or (ii) a second monomer having a hydrogen bond acceptor end group; (iii) a third monomer having a positively charged or negatively charged end group; and (iv) a crosslinker; (b) a plurality of covalent crosslinks between the plurality of polymer backbones; (c) a plurality of reversible, non-covalent crosslinks between the plurality of polymer backbones; and (d) a plurality of ionic side groups pendant from the plurality of polymer backbones. In certain embodiments, the polymer network can comprise another monomer serving as a chain extender.

In various aspects, the first monomer has a hydrogen bond donor end group. Examples of first monomers include, but are not limited to, vinyl, acrylate, or methacrylate monomers containing a hydrogen atom bonded to an electronegative atom such as oxygen, nitrogen, e.g., hydroxides, carboxylic acids, amides, and amines. In a further aspect, the first monomer is a methacrylic acid (MAAc) monomer.

In various aspects, the second monomer has a hydrogen bond acceptor end group. Examples of second monomers include, but are not limited to, acrylamides. In a further aspect, the second monomer is a n,n-dimethacrylamide (DMAA) monomer.

In various aspects, each of the first monomer and the second monomer are monoacrylates.

In various aspects, the third monomer has a positively-charged or negatively-charged end group. In a further aspect, the third monomer has a positively-charged end group. In a still further aspect, the third monomer has a negatively-charged end group. Examples of third monomers include, but are not limited to, any monomer with the structure A-xx-B, where A is an acrylate or methacrylate group, and B is a tertiary ammonium, quaternary ammonium, imidazolinium, phosphonium, sulfonic acid, carboxylic acid, or another functional group bearing a strong positive or negative charge. In yet a further aspect, the third monomer is a 2-acrylamido-2-methylpropane sulfonic acid (AMPS) monomer or a [2-(methacryloxyloxy)ethyl] trimethylammonium chloride (MAOTMAC) monomer.

In various aspects, the first monomer is a MAAc monomer, the second monomer is a DMAA monomer, and the third monomer is an AMPS monomer or a MAOTMAC monomer.

Examples of crosslinkers include, but are not limited to, difunctional aliphatic monomers, aromatic monomers, ureas, urethanes, and glycols, where "difunctional" means that the monomer chain is terminated with two vinyl, acrylate, or methacrylate groups. In a further aspect, the crosslinker is a diacrylate or a dimethacrylate. Examples of diacrylates and dimethacrylates include, but are not limited to, 1-(acryloyloxy)-3-(methacryloxyloxy)-2-propanol, 1,3-butanediol dimethacrylate, bis(4-methacryloylthiophenyl) sulfide, 1,6-bis(acryloyloxy)-2,2,3,3,4,4,5,5-octafluorohexane, 1,9-bis(acryloyloxy)nonane, 1,4-bis(acryloyloxy) butane, 1,6-bis(acryloyloxy)hexane, 1,10-bis(acryloyloxy) decane, glycerol dimethacrylate, 1,6-bis(acryloyloxy)-2,2,3,3,4,4,5,5-octafluorohexane, diethylene glycol dimethacrylate, dipropylene glycol diacrylate, 1,12-dodecanediol dimethacrylate, diethylene glycol diacrylate, ethylene glycol dimethacrylate, 1,6-hexanediol dimethacrylate, 4,4'-isopropylidenediphenol dimethacrylate, neopentyl glycol dimethacrylate, neopentyl glycol diacrylate, nonamethylene glycol dimethacrylate, pentaerythritol tetraacrylate, polyethylene glycol diacrylate, polyethylene glycol dimethacrylate, trimethylolpropane trimethacrylate, triethylene glycol dimethacrylate, trimethylolpropane triacrylate, polyethylene glycol dimethacrylate, tetraethylene glycol diacrylate, tris(2-acryloyloxyethyl) isocyanurate, tripropylene glycol diacrylate, tetraethylene glycol dimethacrylate, and tetramethylene glycol dimethacrylate. In a still further aspect, the crosslinker is poly(ethylene glycol) diacrylate (PEGDA). In yet a further aspect, the crosslinker is selected from diurethane dimethacrylate (DUDA) and glycerol dimethacrylate (GDMA), or a combination thereof.

In a further aspect, the membrane is prepared via solution casting.

In a further aspect, the membrane is an ion exchange membrane.

In various aspects, the membrane has a conductivity of from about 3.0 mS/cm to about 15.0 mS/cm, about 3.0 mS/cm to about 12.0 mS/cm, about 3.0 mS/cm to about 9.0 mS/cm, about 3.0 mS/cm to about 6.0 mS/cm, about 6.0 mS/cm to about 15.0 mS/cm, about 9.0 mS/cm to about 15.0 mS/cm, or about 12.0 mS/cm to about 15.0 mS/cm. In a further aspect, the membrane has a conductivity of from about 3.0 mS/cm to about 15.0 mS/cm.

In various aspects, the membrane has a permselectivity of from about 70% to about 99%, about 70% to about 95%, about 70% to about 90%, about 70% to about 85%, about 70% to about 80%, about 70% to about 75%, about 75% to about 99%, about 80% to about 99%, about 85% to about 99%, about 90% to about 99%, or about 95% to about 99%. In a further aspect, the membrane has a permselectivity of from about 70% to about 99%.

In various aspects, the membrane has a conductivity of from about 3.0 mS/cm to about 15.0 mS/cm and a permselectivity of at least about 70%.

In various aspects, the membrane has a conductivity of from about 6.0 mS/cm to about 15.0 mS/cm and a permselectivity of from about 85% to about 99%.

In various aspects, the membrane has a modulus of from about 10 MPa to about 250 MPa, about 10 MPa to about 225 MPa, about 10 MPa to about 200 MPa, about 10 MPa to about 175 MPa, about 10 MPa to about 150 MPa, about 10 MPa to about 125 MPa, about 10 MPa to about 100 MPa, about 10 MPa to about 75 MPa, about 10 MPa to about 50 MPa, about 10 MPa to about 25 MPa, about 25 MPa to about 250 MPa, about 50 MPa to about 250 MPa, about 75 MPa to about 250 MPa, about 100 MPa to about 250 MPa, about 125 MPa to about 250 MPa, about 150 MPa to about 250 MPa, about 175 MPa to about 250 MPa, about 200 MPa to about 250 MPa, about 225 MPa to about 250 MPa, about 25 MPa to about 225 MPa, about 50 MPa to about 200 MPa, about 75 MPa to about 175 MPa, or about 100 MPa to about 150 MPa.

In various aspects, the membrane has a water uptake/swelling degree of from about 20% to about 150%, about 20% to about 125%, about 20% to about 100%, about 20% to about 75%, about 20% to about 50%, about 50% to about 150%, about 75% to about 150%, about 100% to about 150%, about 125% to about 150%, about 50% to about 125%, or about 75% to about 100%.

F. Methods of Making Membranes

In one aspect, disclosed are methods for making a disclosed membrane. Thus, in various aspects, disclosed are methods for making a disclosed membrane, the method comprising the steps of: (a) providing a composition comprising the polymer network; (b) coating the composition onto the porous support; and (c) curing the composition using ultraviolet light, thereby forming the membrane. In a further aspect, the polymer network comprises: (a) a plurality of polymer backbones formed by co-polymerization of: (i) a first monomer having a hydrogen bond donor end group; and/or (ii) a second monomer having a hydrogen bond acceptor end group; (iii) a third monomer having a positively charged or negatively charged end group; and (iv) a crosslinker; (b) a plurality of covalent crosslinks between the plurality of polymer backbones; (c) a plurality of reversible, non-covalent crosslinks between the plurality of polymer backbones; and (d) a plurality of ionic side groups pendant from the plurality of polymer backbones. In certain embodiments, the polymer network can comprise another monomer serving as a chain extender.

In a further aspect, the membrane is an ion exchange membrane.

The subject matter disclosed herein is directed to the following embodiments:

1. A polymer network comprising:
(a) a plurality of polymer backbones formed by co-polymerization of:
 i. a first monomer having a hydrogen bond donor end group and/or
 a second monomer having a hydrogen bond acceptor end group;
 ii. a third monomer having a positively charged or negatively charged end group; and
 iii. a crosslinker;
(b) a plurality of covalent crosslinks between the plurality of polymer backbones;
(c) a plurality of reversible, non-covalent crosslinks between the plurality of polymer backbones; and
(d) a plurality of ionic side groups pendant from the plurality of polymer backbones.

2. The polymer network of claim 1, wherein the network comprises both the first monomer having a hydrogen bond donor end group and the second monomer having a hydrogen bond acceptor end group.

3. A polymer network comprising:
(a) a plurality of polymer backbones formed by co-polymerization of:
 i. a first monomer having a hydrogen bond donor end group;
 ii. a second monomer having a hydrogen bond acceptor end group;
 iii. a third monomer having a positively charged or negatively charged end group; and
 iv. a crosslinker;
(b) a plurality of covalent crosslinks between the plurality of polymer backbones;
(c) a plurality of reversible, non-covalent crosslinks between the plurality of polymer backbones; and
(d) a plurality of ionic side groups pendant from the plurality of polymer backbones.

4. A polymer network comprising:
(a) a plurality of polymer backbones formed by co-polymerization of:
 i. a first monomer having a hydrogen bond donor end group or
 a second monomer having a hydrogen bond acceptor end group;
 ii. a third monomer having a positively charged or negatively charged end group; and
 iii. a crosslinker;
(b) a plurality of covalent crosslinks between the plurality of polymer backbones;
(c) a plurality of reversible, non-covalent crosslinks between the plurality of polymer backbones; and
(d) a plurality of ionic side groups pendant from the plurality of polymer backbones.

5. The polymer network of any one of embodiments 1-4, wherein the first monomer is a methacrylic acid (MAAc) monomer.

6. The polymer network of any one of embodiments 1-5, wherein the second monomer is a N,N-dimethacrylamide (DMAA) monomer.

7. The polymer network of any one of embodiments 1-4, wherein each of the first monomer and the second monomer are monoacrylates.

8. The polymer network of any one of embodiments 1-7, wherein the ratio of the first monomer to the second monomer is about 1:1.

9. The polymer network of any one of embodiments 1-7, wherein the ratio of the first monomer to the second monomer is about 1:3.

10. The polymer network of any one of embodiments 1-7, wherein the ratio of the first monomer to the second monomer is about 3:1.

11. The polymer network of any one of embodiments 1-10, wherein the first monomer and the second monomer together are present in an amount of from about 1 wt % to about 25 wt %.

12. The polymer network of any one of embodiments 1-10, wherein the first monomer and the second monomer together are present in an amount of from about 0.01% to about 67%, on a molar fraction basis.

13. The polymer network of any one of embodiments 1-12, wherein the third monomer has a positively charged end group.

14. The polymer network of any one of embodiments 1-12, wherein the third monomer has a negatively charged end group.

15. The polymer network of any one of embodiments 1-14, wherein the third monomer is a 2-acrylamido-2-methylpropane sulfonic acid (AMPS) monomer or a [2-(methacryloxyloxy)ethyl] trimethylammonium chloride (MAOTMAC) monomer.

16. The polymer network of any one of embodiments 1-4, wherein the first monomer is a MAAc monomer, the second monomer is a DMAA monomer, and the third monomer is an AMPS monomer or a MAOTMAC monomer.

17. The polymer network of any one of embodiments 1-16, wherein the crosslinker is a diacrylate or a dimethacrylate.

18. The polymer network of any one of embodiments 1-16, wherein the crosslinker is poly(ethylene glycol) diacrylate (PEGDA).

19. The polymer network of any one of embodiments 1-16, wherein the crosslinker is selected from diurethane dimethacrylate (DUDA) and glycerol dimethacrylate (GDMA), or a combination thereof.

20. The polymer network of embodiment 19, wherein the crosslinker is a combination of DUDA and GDMA, and wherein the ratio of DUDA to GDMA is about 3:1.

21. The polymer network of any one of embodiments 1-20, wherein the molar ratio of the crosslinker to the third monomer is from about 0.5:1 to 2:1.

22. The polymer network of any one of embodiments 1-21, wherein the molar ratio of the first and second monomer, combined, to the third monomer is from about 0.5:1 to 1.5:1.

23. The polymer network of any one of embodiments 1-22, wherein co-polymerization is in the presence of an initiator.

24. The polymer network of embodiment 23, wherein the initiator is present in an amount of from about 0.01 wt % to about 1.0 wt %.

25. The polymer network of embodiment 23 or 24, wherein the initiator is present in an amount of about 0.1 wt % or less.

26. The polymer network of any one of embodiments 23-25, wherein the initiator is Irgacure 2959.

27. The polymer network of any one of embodiments 1-26, wherein co-polymerization is via ultraviolet (UV) crosslinking.

28. The polymer network of any one of embodiments 1-27, wherein the polymer network has a conductivity of from about 3.0 mS/cm to about 15.0 mS/cm.

29. The polymer network of any one of embodiments 1-27, wherein the polymer network has a permselectivity of from about 70% to about 99%.

30. The polymer network of any one of embodiments 1-27, wherein the polymer network has a conductivity of from about 3.0 mS/cm to about 15.0 mS/cm and a permselectivity of at least about 70%.

31. The polymer network of any one of embodiments 1-27, wherein the polymer network has a conductivity of from about 6.0 mS/cm to about 15.0 mS/cm and a permselectivity of from about 85% to about 99%.

32. A membrane having a porous support and a polymer layer comprising the polymer network of any one of embodiments 1-31.

33. A polymer film comprising the polymer network of any one of embodiments 1-32, wherein the polymer film is formed on a glass substrate.

34. A method of making a polymer network, the method comprising co-polymerizing:

(a) a first monomer having a hydrogen bond donor end group and/or
  a second monomer having a hydrogen bond acceptor end group;
(b) a third monomer having a positively- or negatively-charged end group; and
(c) a crosslinker, wherein the polymer network comprises a plurality of polymer backbones, a plurality of covalent crosslinks between the plurality of polymer backbones, a plurality of reversible, non-covalent crosslinks between the plurality of polymer backbones, and a plurality of ionic side groups pendant from the plurality of polymer backbones.

35. The method of embodiment 34, wherein the polymer network comprises the first monomer having a hydrogen bond donor end group and the second monomer having a hydrogen bond acceptor end group.

36. A method of making a polymer network, the method comprising co-polymerizing:

(a) a first monomer having a hydrogen bond donor end group;
(b) a second monomer having a hydrogen bond acceptor end group;
(c) a third monomer having a positively- or negatively-charged end group; and
(d) a crosslinker, wherein the polymer network comprises a plurality of polymer backbones, a plurality of covalent crosslinks between the plurality of polymer backbones, a plurality of reversible, non-covalent crosslinks between the plurality of polymer backbones, and a plurality of ionic side groups pendant from the plurality of polymer backbones.

37. The polymer network of embodiment 1, wherein the network comprises a plurality of polymer backbones formed by co-polymerization of:

a first monomer having a hydrogen bond donor end group;
a third monomer having a positively charged or negatively charged end group; and
a crosslinker.

38. The polymer network of embodiment 1, wherein the network comprises a plurality of polymer backbones formed by co-polymerization of:

a second monomer having a hydrogen bond acceptor end group;
a third monomer having a positively charged or negatively charged end group; and
a crosslinker.

39. The polymer network of any one of embodiments 1-33, further comprising a fourth monomer, wherein the fourth monomer is a chain extender.

40. The chain extender of embodiment 39, wherein the chain extender is methylmethacrylate.

EXAMPLES

The following examples are put forth so as to provide those of ordinary skill in the art with a complete disclosure and description of how the devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The Examples are provided herein to illustrate the invention, and should not be construed as limiting the invention in any way. Examples are provided herein to illustrate the invention and should not be construed as limiting the invention in any way.

Reagents

2-Acrylamido-2-methylpropane sulfonic acid (AMPS)—a corrosive solid, non-Regulated, a negatively charged monomer. MW=207.25 g/mol. Sigma-Aldrich Cat. No. 282731-250G; [2-(methacryloyloxy)ethyl] trimethylammonium chloride (MAOTMAC)—80 wt % in water, non-regulated, positively charged monomer. MW=207.7 g/mol. Sigma-Aldrich Cat. No. 408107-250ML; Methacrylic acid (MAAc)—a combustible liquid, a hydrogen bond donor. MW=86.09 g/mol Fisher Cat. No. AAA1154336; N,N-dimethacrylamide (DMAA)—a combustible liquid, a hydrogen bond acceptor. MW=99.13 g/mol Fisher Cat. No. AA4240518; poly(ethylene glycol) diacrylate (PEGDA, covalent crosslinker, average $M_n$=250 g·mol$^{-1}$), Glycerol Dimethacrylate (GDMA)—a liquid, non-RCRA, a covalent crosslinker. MW=228.24 Fisher Cat. No. 50-014-23696; Diurethane Diacrylate (DUDA)—a covalent crosslinker. MW=470.56 g/mol. Sigma-Aldrich Cat. No. 436909-500ML; 1-[4-(2-Hydroxyethoxy)-phenyl]-2-hydroxy-2-methyl-1-propane-1-one (IRGACURE 2959)—an initiator. MW=224.3; 1-propanol—a flammable liquid), an organic solvent. MW=60.10 Sigma-Aldrich Cat. No. 402893-500ML.

A list of exemplary reagents and their corresponding structures is shown in Table 1 below.

$$IEC = \frac{\text{mmol of charged monomer}}{\text{g of charged monomer} + \text{g of crosslinkers}}$$

DUDA Crosslinked Membranes

For covalent crosslinkers, it was found that a 3:1 molar ratio of DUDA:GDMA results in reasonably durable films while remaining soluble enough to use water+propanol as solvents. In general, it is not possible to use only DUDA because of its limited solubility in water.

| Name | Structure |
| --- | --- |
| AMPS | 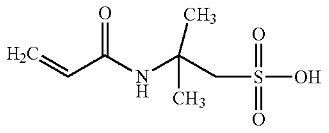 |
| MAOTMAC | 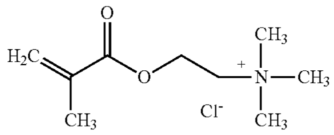 |
| MAAc | 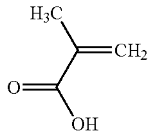 |
| DMAA | 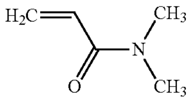 |
| PEGDA (n ~ 250) | 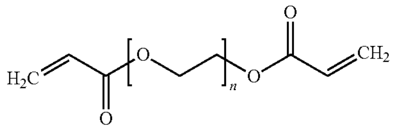 |
| GDMA | 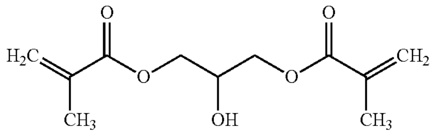 [SMILES: C=C(C)C(=O)OCC(O)COC(=O)C(=C)C] |
| DUDA | 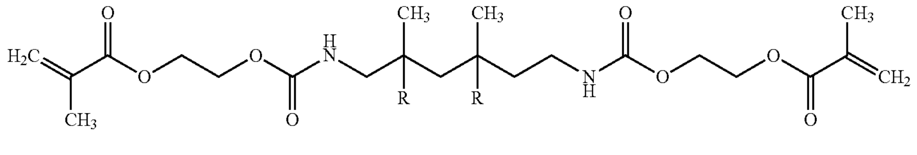 R = H or $CH_3$ (~1:1) |

Polymer Mixture Design

The ion exchange capacity (IEC) and degree of crosslinking of the resulting membrane can be adjusted by changing the relative amounts of charged monomer (AMPS or MAOTMAC) and crosslinkers (PEGDA, GDMA, DUDA, DMAA, MAAc) in the pre-polymerization mixture. The theoretical IEC is determined from the composition of the pre-polymerization mixture as:

The hydrogen bond donor/acceptor are added in a 1:1 molar ratio to promote the formation of dynamic crosslinks. Without wishing to be bound by theory, it was found that it is not possible to replace all of the crosslinking with dynamic crosslinks: the pre-polymerization mixture turns into a gel that never cures into a film. Membranes in which up to ⅔ of the total crosslinks were hydrogen bond donor/acceptor pairs were tested with good results.

The amount of solvent (water or propanol) used to dissolve the monomer generally just has to be sufficient to ensure that all solids dissolve into the mixture. The recipes below try to keep the monomers close to their solubility limit. In principle, this should keep the monomers closer together and promote the formation of a gel or network. Previous studies have reported that lower monomer concentrations (i.e., more solvent) can increase the water uptake in the membrane by reducing the effective number of covalent crosslinks. As the monomers become further apart in solution, they become more likely to form loops (i.e., inactive crosslinks). The present work has not verified this.

The initiator concentration used by Kamcev is approximately 0.01 mol initiator/mol monomer+crosslinker or about 0.07M, or about 2 wt %. For initiators like Irgacure, initiator concentrations of 0.5-2.0 wt % appear to be common. A higher initiator concentration speeds up the polymerization (rate is proportional to initiator ^ 0.5), but also can increase the rate of chain termination reactions, resulting in shorter polymer chains. Without wishing to be bound by theory, it was found that keeping the initiator concentration low resulted in the best quality films.

It is noted that for AEM mix designs, the water that is already present in the MAOTMAC solution must be accounted for when doing the calculations. Generally, it is not necessary to add any extra water to AEM recipes.

After determining the quantity of charged monomer and crosslinker that will be used, proceed to the synthesis procedure.

The recipes for a series of AEMs and CEMs that were synthesized using DUDA are shown in FIG. 1 and Table 2.

the moles of charge and PEGDA. It was discovered that a ratio of 1 mol total (MMA+MAAc+DMAA) per mol of MAOTMAC worked well, but could be easily adjusted.

The extent of conversion of the membranes was measured and it was discovered that ~85% of the monomer in the pre-polymerization mixture was incorporated into the crosslinked membrane; the remaining monomers washed out after the membrane was equilibrated in solution. It is hypothesized that all monomers have similar reactivity and therefore form a random copolymer.

Figure 2:
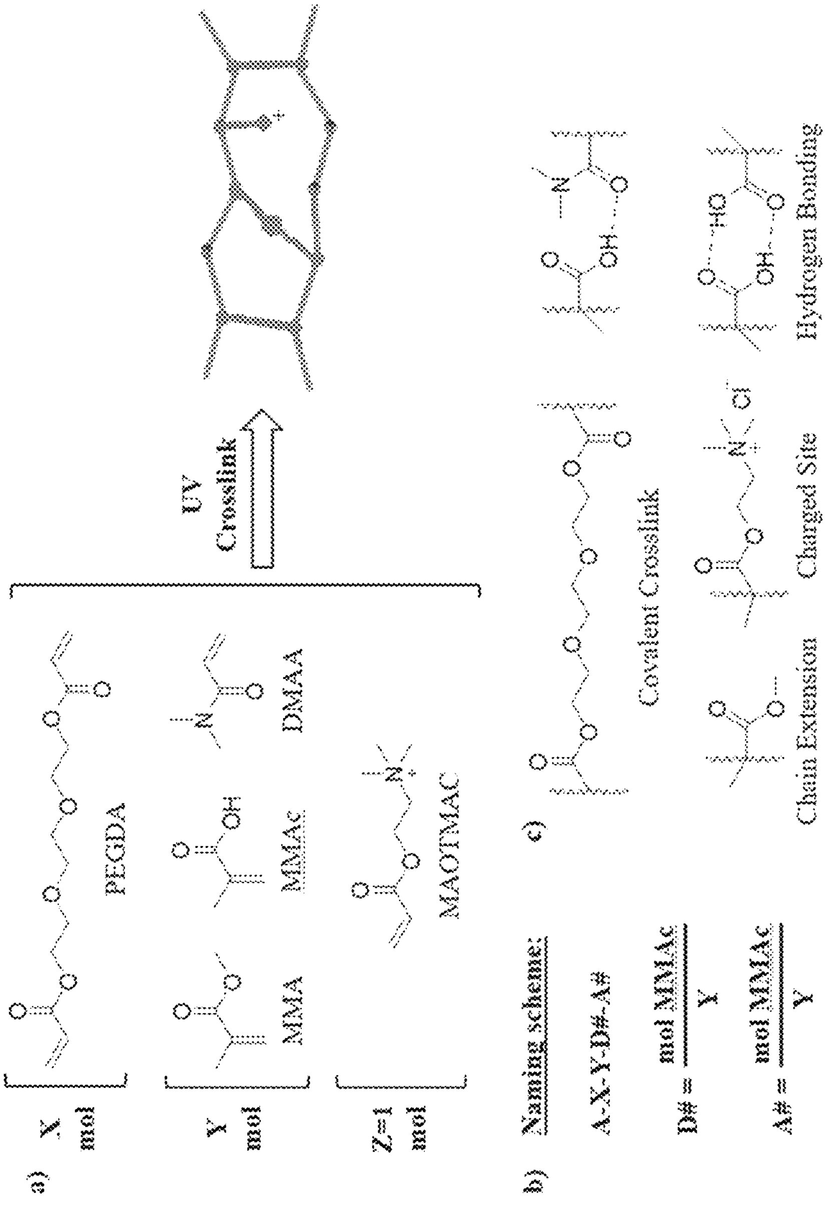
FIG. 2 shows the synthesis of anion exchange membranes with physical crosslinks mediated by hydrogen bonding. a) Photocrosslinkable monomers; b) Membrane naming scheme; c) Functionalities imparted by the various monomers. PEGDA forms covalent crosslinks; MAAc is a hydrogen bond donor, DMAA is a hydrogen bond acceptor, MMA acts as a chain extender, and MAOTMAC provides cationic sites.

As in the case of using DUDA, it was discovered that it is not possible to replace all of the crosslinking with non-covalent crosslinks: the pre-polymerization mixture turns into a gel that never cures into a film. FIG. 2 shows a schematic of various membranes prepared using PEGDA.

In general, systems without MAAc are challenging from a solubility standpoint, because MAAc acts as a co-solvent for the other components. Tests were performed using ethanol, propanol, isopropanol, and acetic acid as solvents and it was discovered that ethanol gave both good solubility and final membrane properties. For a recipe incorporating 0.6 mol PEGDA, 1 mol MMA, and 1 mol MAOTMAC, it was discovered that 73 wt % was the maximum total monomer concentration that was soluble when the mixture was heated at 50° C. Higher concentrations can be used if the membrane contains MAAc or if more heating is implemented.

TABLE 2

| Sample | di-acrylate (X) | Mono-acrylate (Y) | X + Y | DMAA (mol) | MAAc (mol) | DUDA (mol) | GDMA (mol) | Charge (mol) |
|---|---|---|---|---|---|---|---|---|
| C-187-1.3-H0 | 1 | 0 | 1 | 0 | 0 | 0.75 | 0.25 | 1.25 |
| C-210-1.3-H33 | 0.67 | 0.33 | 1 | 0.33 | 0.33 | 0.50 | 0.17 | 1.25 |
| C-241-1.3-H67 | 0.33 | 0.67 | 1 | 0.67 | 0.67 | 0.25 | .08 | 1.25 |
| A-187-1.3-H0 | 1 | 0 | 1 | 0 | 0 | 0.75 | 0.25 | 1.25 |
| A-210-1.3-H33 | 0.67 | 0.33 | 1 | 0.33 | 0.33 | 0.50 | 0.17 | 1.25 |
| A-241-1.3-H67 | 0.33 | 0.67 | 1 | 0.67 | 0.67 | 0.25 | .08 | 1.25 |

PEGDA Crosslinked Membranes

For the PEGDA-based membranes, it was discovered that a ratio of 0.6 mol PEGDA per mol MAOTMAC (equivalent to a 1.2:1 ratio of crosslinks to charges on the polymer chain, since PEGDA has 2 polymerizable groups per molecule) produced durable films with a moderate swelling degree. Higher or lower ratios should yield lower and higher swelling degrees, respectively.

It is worthwhile to point out that the chemistry of the crosslinker has a big effect on the swelling degree of the final membrane. It was discovered that changing the crosslinker from PEGDA to DUDA causes the swelling degree to decrease by about half, even though PEGDA and DUDA have a similar length. Without wishing to be bound by theory, it is understood that this happens because DUDA is much less hydrophilic than PEGDA.

In several experiments, the total molar amount of chain extender, hydrogen bond donor, and hydrogen bond acceptor was fixed (total moles of MMA+MAAc+DMAA) relative to Table 3 shows the molar compositions for membranes prepared herein. In particular, Table 3 shows the data for the following membranes:

- Anion exchange membranes prepared with different ratios of hydrogen bond donor and hydrogen bond acceptor (e.g., 1:1, 1:3, 3:1, etc.). These membranes are PEGDA-crosslinked.
- Anion exchange membranes with only a donor or acceptor, added at different loadings. These membranes are PEGDA crosslinked.
- Anion exchange membranes and cation exchange membranes crosslinked with DUDA+GDMA with a 1:1 loading of donor and acceptor.

The crosslinkers used in the experiments were a mixture of either: DUDA+GDMA; or PEGDA.

Monomers: the hydrogen bond donors were methacrylic acid; the hydrogen acceptors were DMAA. Charged groups were either MAOTMAC for anion exchange membranes or AMPS for cation exchange membranes.

TABLE 3

| Sample | Theoretical IEC (meq.g$^{-1}$) | % of Y that is D or A | PEGDA or DUDA* (X) (mol × 2) | MMA (Y) (mol) | MAAc (Y) (D, mol) | DMAA (Y) (A, mol) | MAOTMAC (Z) (mol) | Total monomer concentration (wt %) | Gel Fraction (%) |
|---|---|---|---|---|---|---|---|---|---|
| PEGDA-crosslinked anion exchange membranes | | | | | | | | | |
| A-1.2-1-D0-A0 | 2.18 | 0 | 1.2 | 1 | 0 | 0 | 1 | 73% | 86% ± <1% |
| A-1.2-1-D13-A13 | 2.19 | 25% | 1.2 | 0.75 | 0.125 | 0.125 | 1 | 73% | 84% ± 1% |
| A-1.2-1-D25-A25 | 2.20 | 50% | 1.2 | 0.5 | 0.25 | 0.25 | 1 | 73% | 82% ± 3% |
| A-1.2-1-D38-A38 | 2.21 | 75% | 1.2 | 0.25 | 0.375 | 0.375 | 1 | 73% | 84% ± <1% |
| A-1.2-1-D50-A50 | 2.22 | 100% | 1.2 | 0 | 0.5 | 0.5 | 1 | 73% | 84% ± 1% |
| A-1.2-1-D50-A0 | 2.22 | 50% | 1.2 | 0.5 | 0.5 | 0 | 1 | 73% | 82% ± <1% |
| A-1.2-1-D100-A0 | 2.25 | 100% | 1.2 | 0 | 1.0 | 0 | 1 | 73% | 83% ± <1% |
| A-1.2-1-D0-A50 | 2.19 | 50% | 1.2 | 0.5 | 0 | 0.5 | 1 | 73% | 85% ± <1% |
| A-1.2-1-D0-A100 | 2.19 | 100% | 1.2 | 0 | 0 | 1.0 | 1 | 73% | 85% ± 1% |
| A-1.2-1-D25-A75 | 2.20 | 100% | 1.2 | 0 | 0.25 | 0.75 | 1 | 73% | 83% ± <1% |
| A-1.2-1-D75-A25 | 2.24 | 100% | 1.2 | 0 | 0.75 | 0.25 | 1 | 73% | 81% ± <1% |
| DUDA-crosslinked anion exchange membranes | | | | | | | | | |
| A-1.2-1-D50-A50 | 1.72 | 100% | 1.2 | 0 | 0.5 | 0.5 | 1 | 73% | 85% ± <1% |
| A-1.6-0-D0-A0 | 1.87 | 100% | 1.6 | 0 | 0 | 0 | 1 | 71% | ND** |
| A-1.1-0.5-D50-A50 | 2.10 | 100% | 1.1 | 0 | 0.27 | 0.27 | 1 | 74% | ND** |
| A-0.5-1.1-D50-A50 | 2.41 | 100% | 0.5 | 0 | 0.54 | 0.54 | 1 | 78% | ND** |
| DUDA-crosslinked cation exchange membranes | | | | | | | | | |
| C-1.6-0-D0-A0 | 1.87 | 100% | 1.6 | 0 | 0 | 0 | 1 | | ND** |
| C-1.1-0.5-D50-A50 | 2.10 | 100% | 1.1 | 0 | 0.27 | 0.27 | 1 | | ND** |

TABLE 3-continued

| Sample | Theoretical IEC (meq.g$^{-1}$) | % of Y that is D or A | PEGDA or DUDA* (X) (mol × 2) | MMA (Y) (mol) | MAAc (Y) (D, mol) | DMAA (Y) (A, mol) | MAOTMAC (Z) (mol) | Total monomer concentration (wt %) | Gel Fraction (%) |
|---|---|---|---|---|---|---|---|---|---|
| C-0.5-1.1-D50-A50 | 2.41 | 100% | 0.5 | 0 | 0.54 | 0.54 | 1 | | ND** |

*Mixture of DUDA and GMDA in a 3:1 molar ratio.
**Not measured

Synthesis

A. DUDA Crosslinked Membranes

First, set out the reagents and supplies: water, propanol, charged monomer, hydrogen bond donor/acceptor, covalent crosslinkers, and initiator. In addition to the reagents, 1-2 weigh papers, 1-2 plastic spatulas, 2-3 pasteur pipettes, 2 plastic transfer pipettes, 1-2 40-mL glass vials with caps and small stir bars, and some foil to insulate one of the vials from light will be needed. Due to its very high viscosity, it is helpful to let the DUDA warm to room temperature prior to making the mixture.

Next, measure the chosen mass of charged monomer (AMPS or MAOTMAC) into a glass vial. If you are making a CEM, the AMPS is a solid. By measuring the solid reagents first, the possibility of getting liquid onto the weigh pan of the balance is avoided. If there is liquid on the pan, it will absorb onto the weigh paper and make some of the solid reagents stick to the paper. Also, if liquid is placed into the vials, then it is more likely that the solid reagents will stick to the walls rather than collect in the bottom of the vial.

If a CEM is being prepared, measure the chosen mass of water, MAAc, DMAA, and propanol into the vial containing AMPS. Then measure the chosen mass of covalent crosslinkers (GDMA and DUDA) into a second vial. Use a plastic Pasteur pipette with the tip cut off to pipette these very viscous liquids. Optionally, wrap this vial in foil. The SDS for GDMA says that it is light-sensitive. While a negative outcome was not observed when the GDMA was not protected from light, it's an easy precaution to take.

If an AEM is being prepared, measure the chosen masses of all remaining monomers and solvent (MAAc, DMAA, DUDA, GDMA, propanol) into the vial containing the MAOTMAC. Then insert stir bars and stir all vials at 700-1000 rpm at 50° C. AMPS has very limited solubility in organic solvents. Thus, including the propanol in the aqueous AMPS solution helps it to pre-dissolve and mix better with the covalent crosslinkers later on. If this is not done, the mixture tends to emulsify. Heat helps the DUDA and GDMA to mix more easily, since both are very viscous. In addition, it was found that all ingredients of the AEM can be mixed together at once in a single vial, saving time. This is partly because the MAOTMAC monomer is purchased as an aqueous solution, so it is pre-dissolved. It was also found that the MAAc helps the solubility of AMPs and improves the miscibility of the aqueous and organic phases. Some solubility problems may be encountered if CEMs are made that don't contain any MAAc.

Next, stir the vial(s) until the contents are transparent and homogeneous. For CEM only, combine the contents of the two vials using a plastic pipette. Continue stirring until the mixture is transparent and homogeneous.

Weigh out the desired mass of initiator (Irgacure 2959) onto a weigh paper. Add it to the vial. Allow it to mix for ~5 min or until the mixture is transparent and homogeneous.

Set one Rain-X treated glass plate on a horizontal surface and place metal spacers overhanging the edge of the plate on 2 sides. It is noted that the glass plate could alternatively be treated with other hydrophobic silane coupling agents. Use a plastic pipette to make a small puddle of pre-polymerization solution on top of the plate (approximately 3 cm in diameter). Cover the plate with clear glass and secure the sides with binder clips. The mixture is covered with another Rain-X treated glass plate both to set the thickness and in order to prevent the solvents from evaporating. It was attempted to cure membranes without a cover; however, usable films were not obtained. Curing was also tried on various substrates (glass, mylar, Kapton, Teflon, aluminum) but Rain-X coated glass was the one that allowed the membrane to be removed most easily.

In general, glass does not transmit UV radiation and quartz is used instead. However, because the present study is using medium-wavelength UV and because the initiator absorbs over a broad range of wavelengths, a good cure can be achieved through glass. By sandwiching the membrane between glass plates, it is possible to flip the membrane over during curing and expose both surface to equal doses of UV radiation.

Next, place the plate in a UV crosslinker equipped with a 302 nm bulb. Cure for a few minutes (2-5 min., usually for DUDA-based membranes as disclosed here). In general, the membrane is flipped at this stage to ensure that the membrane receives the same amount of cure time on both sides (e.g., 2 minutes, then flip, then 2 additional minutes). Alternatively, if PEGDA is being used as the crosslinker, the membrane is cured for 30 minutes, flipping over every 7.5 minutes. The pre-polymerization mixture will undergo photo-induced free radical polymerization and produce a freestanding polymer film. Exemplary absorption spectra and UV bulb output are shown in FIG. 3A and FIG. 3B, respectively.

Figure 3A:
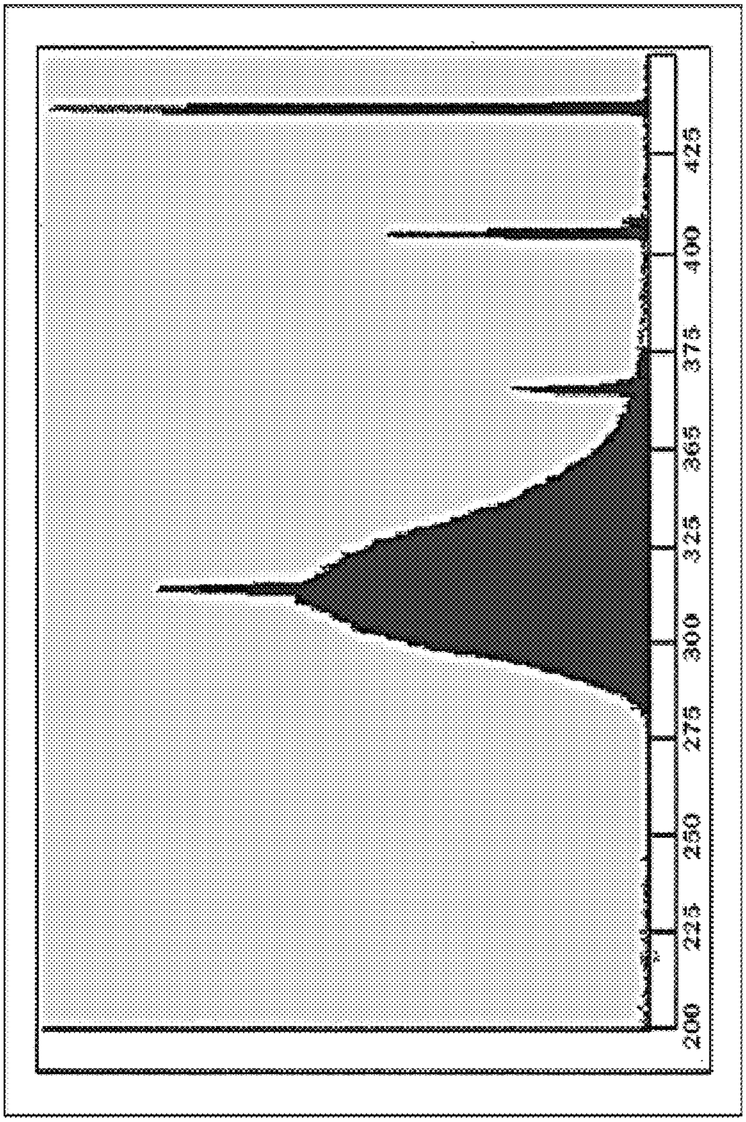
FIG. 3A shows a representative diagram illustrating the spectral output of the UVP 302 nm bulbs used in the crosslinker.
Figure 3B:
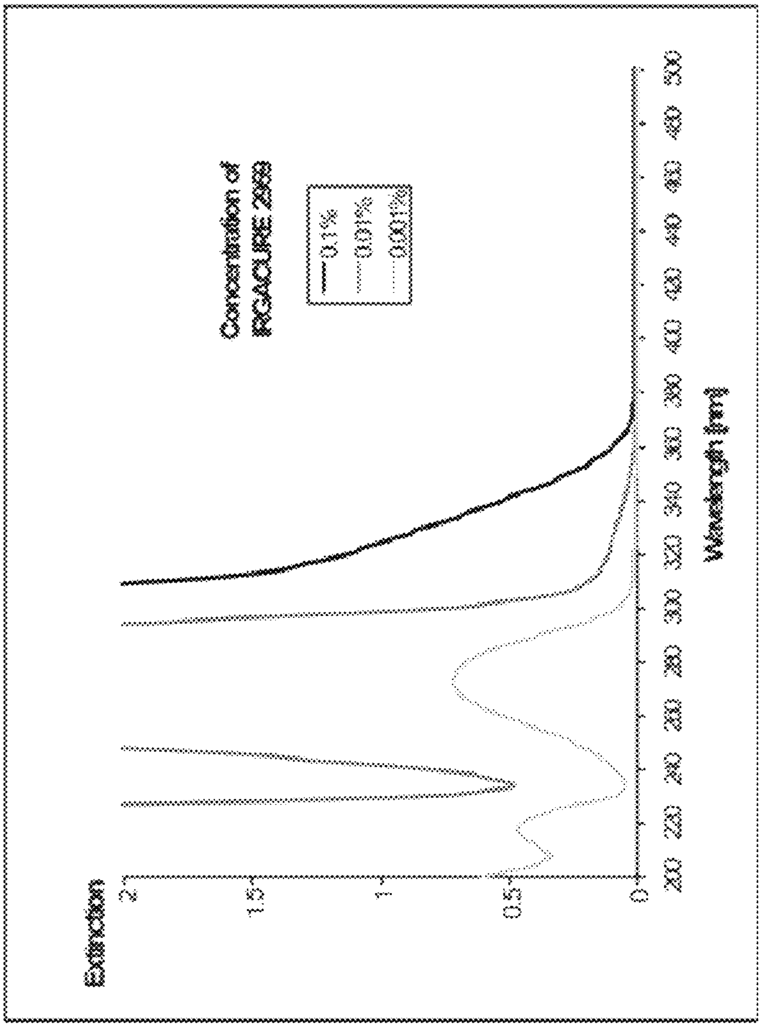
FIG. 3B shows a representative diagram illustrating the absorption spectrum of Irgacure 2959 at various concentrations in acetonitrile.

Referring to FIG. 3A, spectral output of the UVP 302vnm bulbs used in the crosslinker is shown.

It was found that the properties of the film are fairly insensitive to the curing time. Short curing times tend to produce films that are more floppy/weak, while longer curing times tend to make the films more brittle. In general, there does not seem to be a disadvantage to longer curing time—approximately 85% conversion is achieved in both PEGDA- and DUDA-based membranes when they are cured for 30 minutes. The presence of the hydrogen bond donor/acceptor (MAAc/DMAA) does seem to change the kinetics: longer curing time will be required when those monomers are present.

Figure 4:
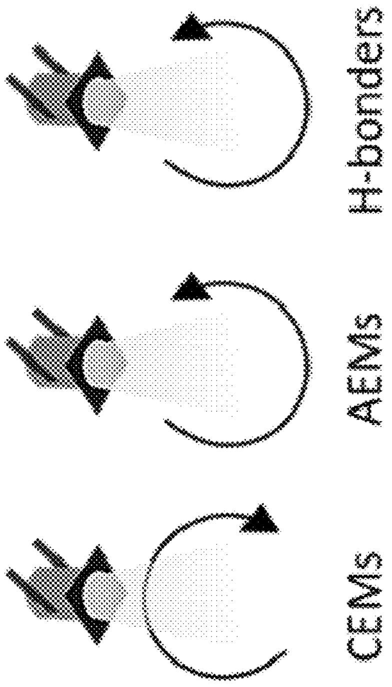
FIG. 4 shows a representative image illustrating the CEMs curl away from the UV light source, whereas AEMs curl toward it.

Next, remove the plates from the crosslinker. Undo the binder clips and carefully lift the top glass off of the Teflon plate. Carefully remove the membrane from the plates and place it in a beaker of DI water or salt solution. It is noted that the membranes curl depending on their composition (see FIG. 4). CEMs curl away from the UV light source, AEMs curl toward it. The more hydrogen bond donor/acceptor that is added, the more the curling tends to go toward the UV light. Thus, AEMs with a lot of hydrogen bond donor/acceptor exhibit the most curling.

Finally, equilibrate the membrane in DI water or salt solution for at least 24 h, replacing the water several times.

B. PEGDA-Crosslinked Membranes

Prepare a 50 mg/mL stock solution of IrgaCure in propanol.

A few hours prior to synthesis, set any refrigerated reagents out on the bench to warm to room temperature.

Place the reagents and supplies in a vent hood: ethanol, MAOTMAC, MMA, MAAc, DMAA, PEGDA. In addition to the reagents, a 40-mL glass vial with a cap and small stir bar for each monomer recipe, one or more micropipettes (100 μl-10 mL range), pipette tips for each reagent, and kimwipes would be helpful.

Use the pipettes to measure the desired volume of each monomer and initiator into the glass vial. Insert stir bar and cap the vial.

Stir the vial(s) at 500 rpm at 50° C. until the contents are transparent and homogeneous. This generally occurs within 5-10 minutes.

Treat 2 clear glass plates with Rain-X (also called a hydrophobic silane coupling agent), to prevent the membrane from sticking to the glass and curling.

Set one Rain-X treated glass plate hydrophobic side up on a horizontal surface and place metal spacers overhanging the edge of the plate on 2 sides. One can tell which side is hydrophobic by squirting a little DI water on the glass. On the hydrophobic side, water will bead.

Use a spray bottle to spray one squirt of ethanol onto the middle of each glass plate. Wipe each plate thoroughly with a clean Kimwipe. Make sure all the alcohol evaporates before proceeding.

Use a micropipette to dispense 1.3 mL of pre-polymerization mixture onto the center of the plate (approximately 3 cm in diameter). When the plates are sandwiched together with 0.127 mm spacers, this volume yields a film ~12 cm in diameter.

Cover the plate with another clear glass plate (hydrophobic side facing the polymer), and secure the sides with binder clips. If available, use a small bubble level to make sure the "polymer sandwich" is approximately level. If not, adjust the binder clips to level it.

Place the plate in a UV crosslinker equipped with a 302 nm bulb. Make sure to provide adequate ventilation around the UV crosslinker using a snorkel hood or vent hood.

Set the crosslinker to "time" mode and cure for 30 minutes, flip the "polymer sandwich" every 7.5 minutes to ensure a uniform cure from both sides. The pre-polymerization mixture will undergo photo-induced free radical polymerization and produce a freestanding polymer film.

Remove the plates from the crosslinker. Undo the binder clips and carefully lift the top glass off of the Teflon plate.

Carefully remove the membrane from the plates and place it in a beaker of DI water or salt solution.

Figure 5:
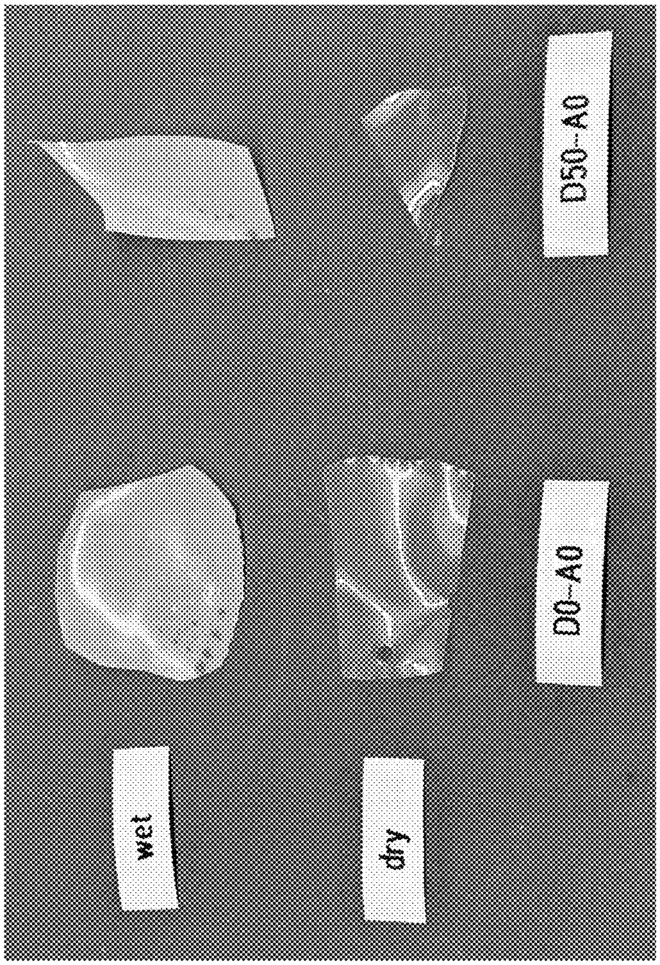
FIG. 5 shows PEGDA-crosslinked IEMs in the wet and dry state. Membranes A-1.2-1-D0-A0 and A-1.2-1-D50-A0 are pictured. The appearance of these membranes was typical of the exemplary materials synthesized and described herein.

Equilibrate the membrane in DI water or salt solution for at least 24 h, replacing the water several times. FIG. 5 shows PEGDA-crosslinked IEMs in the wet and dry state.

Sample Naming Scheme

Two different sample naming schemes are used herein.

In the first, synthesized IEMs were named according to their ion exchange capacity and fraction of total "crosslinks" (covalent crosslinks plus hydrogen-bonding pairs) in the structure. The scheme is:

T-IEC-M-HZ

T=Type: A for anion exchange, C for cation exchange; IEC=ion exchange capacity, meq charge per g of dry polymer; M=mol of charged sites per mol of total chemical+hydrogen bond crosslinks (1.25 in samples, rounded to 1.3 in labels); Z=the fraction of total crosslinks that are hydrogen bonds (0%, 33%, or 67%).

For example, C-241-1.3.H67=cation exchange membrane with IEC=2.41 meq/g, 1.3 mol charged sites per mol of total crosslinks (covalent crosslinks), and 67% of total crosslinks are hydrogen bonding pairs.

In the second scheme, each membrane was designated T-X-Y-D #-A #, where T is either "C" or "A" to indicate a cation exchange membrane or anion exchange membrane, respectively, X is the molar ratio of covalent crosslinks to charged monomer, Y is the molar ratio of monoacrylates to charged monomer, and the #s following D and A represent the molar percentages of Y occupied by hydrogen bond donor (MAAC) and acceptor (DMAA), respectively. The #s following D and A do not necessarily add to 100% and the difference between 100% and the summation of these numbers corresponds to the molar percentage of Y occupied by the chain extender MMA. Thus, A-1.2-1-D25-A25 is an anion exchange membrane with 1.2 mol covalent crosslinks and 1 mol total monoacrylates per mol of charge, wherein MAAc (donor) and DMAA (acceptor) each comprise 25% of the monoacrylates. MMA (chain extender) comprises the remaining 50%.

The polymer networks are synthesized such that the hydrogen donor or hydrogen acceptor functionality are still available after synthesis of the polymer network.

Thermogravimetric Analysis (TGA)

Figure 6:
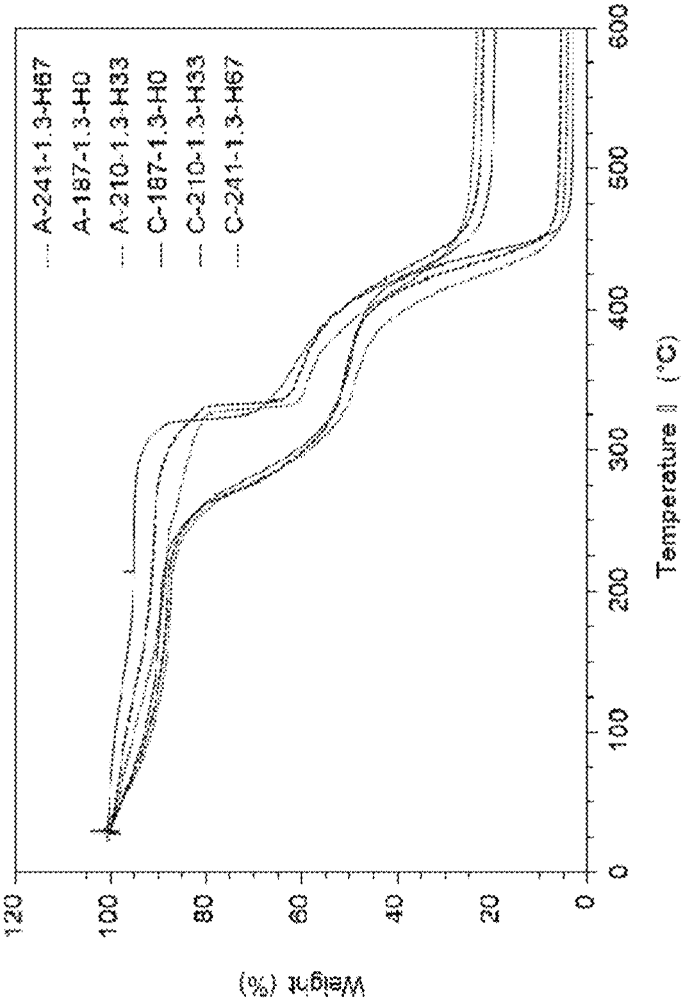
FIG. 6 shows representative TGA analysis of exemplary synthesized ion-exchange membranes.

Both AEMS and CEMs crosslinked with DUDA+GDMA displayed a two-stage decomposition. CEMs showed an initial decomposition around 310° C., while AEMs showed an initial decomposition around 270° C. Both AEMs and CEMs showed secondary decomposition beginning at 400° C. (see FIG. 6).

Differential Scanning Calorimetry (DSC)

None of the synthesized IEMs exhibited a glass transition, indicating that all the materials were highly crosslinked. The gel fraction of all PEGDA-crosslinked membranes was measured and determined it to be above ~85% in all cases, further indicating a high degree of crosslinking (Table 3).

Attenuated Total Reflection Fourier Transform Infrared Spectroscopy (ATR-FTIR)

Figure 7:
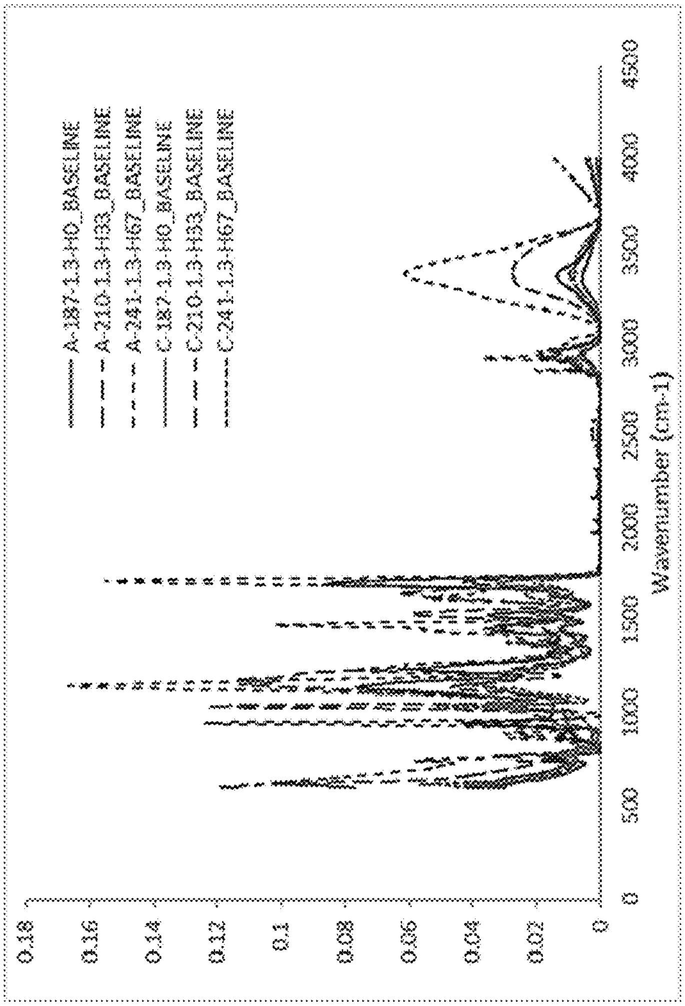
FIG. 7 shows representative FTIR spectra of exemplary synthesized ion-exchange membranes.
Figure 8A:
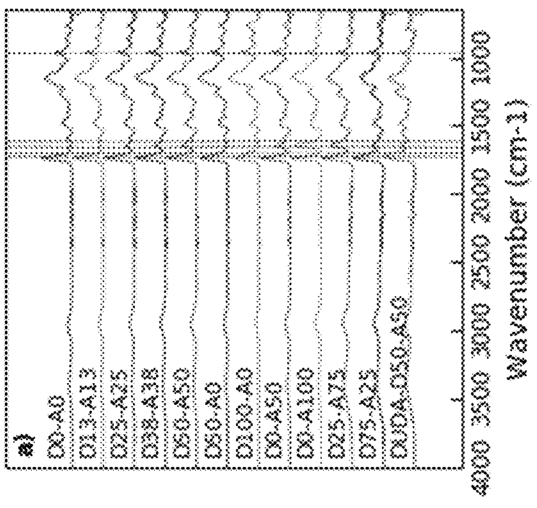
FIG. 8A shows FTIR spectra for all PEGDA-crosslinked membranes investigated herein. Vertical lines are placed at 1720 $cm^{-1}$ (C═O stretch in PEGDA, MMA, MAOTMAC), 1690 $cm^{-1}$ (C═O stretch in MAAc), 1647 $cm^{-1}$ (C═O stretch in DMAA), 1610 $cm^{-1}$ (unidentified peak associated with DMAA), and 956 $cm^{-1}$ (quaternary ammonium headgroups in MAOTMAC).
Figure 8B:
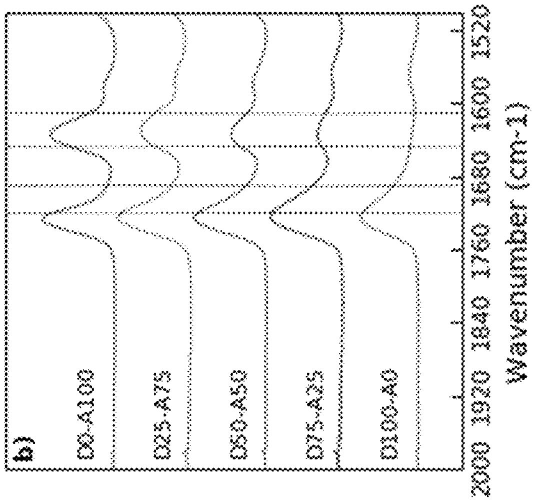
FIG. 8B shows the detail of the C═O stretching region for a subset of the PEGDA-crosslinked membranes. In this subset, the proportion of MAAc:DMAA is varied from 0 to 1 (these membranes contain no MMA). The incorporation of MAAc in the membranes can be seen in the broadening of the peak at ~1720 $cm^{-1}$ toward lower frequencies; incorporation of DMAA is shown by the emergence of a peak between 1647 $cm^{-1}$ and 1610 $cm^{-1}$. Peak positions were identified via spectra of individual monomers and binary mixtures containing only two monomers.
Figure 9A:
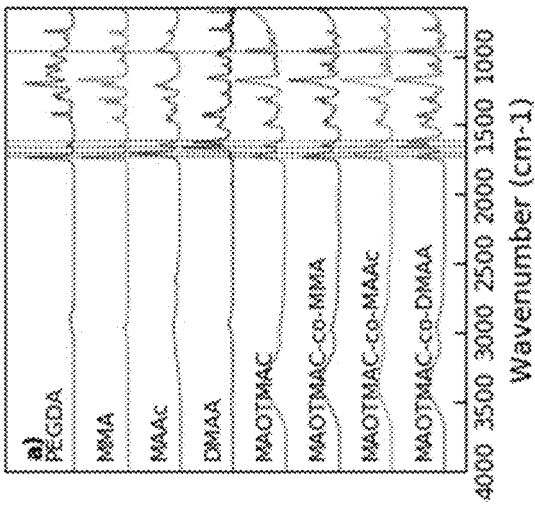
FIG. 9A shows the complete FTIR spectra of individual monomers and comonomer mixtures containing a 1:1 molar ratio of MAOTMAC and either MMA, MAAc, or DMAA. Vertical lines are placed at 1720 $cm^{-1}$ (C═O stretch in PEGDA, MMA, MAOTMAC), 1690 $cm^{-1}$ (C═O stretch in MAAc), 1647 $cm^{-1}$ (C═O stretch in DMAA), 1610 $cm^{-1}$ (unidentified peak associated with DMAA), and 956 $cm^{-1}$ (quaternary ammonium headgroups in MAOTMAC)
Figure 9B:
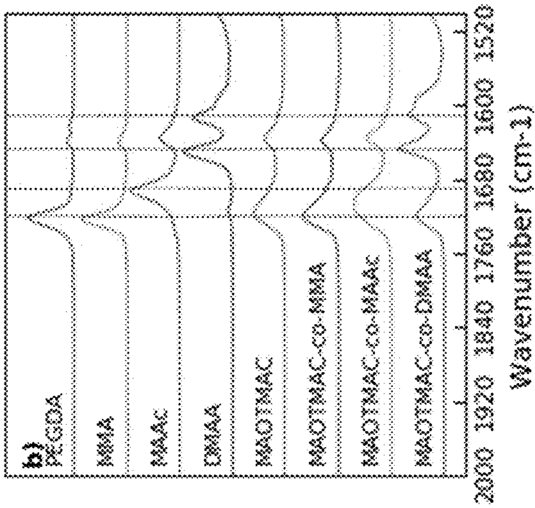
FIG. 9B shows details of the C═O stretching region of individual monomers and comonomer mixtures containing a 1:1 molar ratio of MAOTMAC and either MMA, MAAc, or DMAA.
Figure 10:
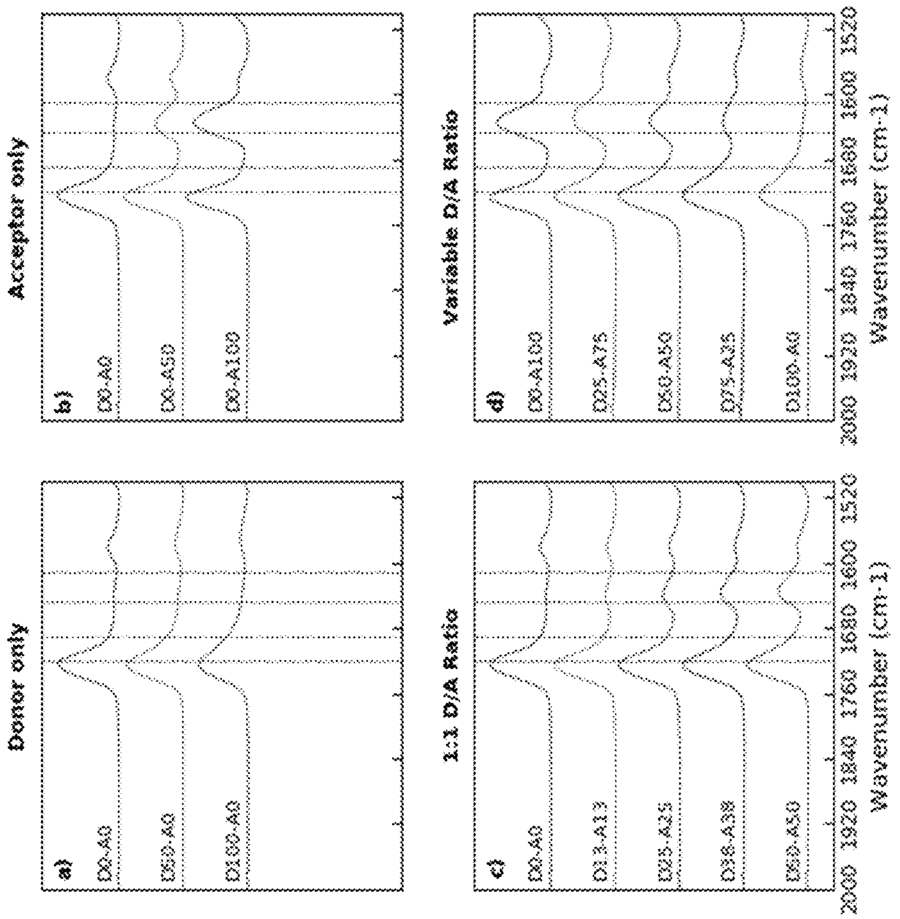
FIG. 10 shows FTIR spectra of PEGDA-crosslinked membranes in the C═O stretching region. Vertical lines are placed at 1720 cm-1 (C═O stretch in PEGDA, MMA, MAOTMAC), 1690 cm-1 (C═O stretch in MAAc), 1647 cm-1 (C═O stretch in DMAA), 1610 cm-1 (unidentified peak associated with DMAA), and 956 cm-1 (quaternary ammonium headgroups in MAOTMAC). a) membranes with H-bond donor MAAc only (no H-bond acceptor DMAA); b) membranes with H-bond acceptor DMAA only (no H-bond donor MAAc); c) membranes with a 1:1 ratio of MAAc to DMAA; d) membranes with no chain extender MMA, in which the ratio of MAAc to DMAA is varied. Labels on all lines correspond to the ends of the labels given in the main text, e.g. "D50-A50" denotes membrane A-1.2-1-D50-A50.
Figure 11:
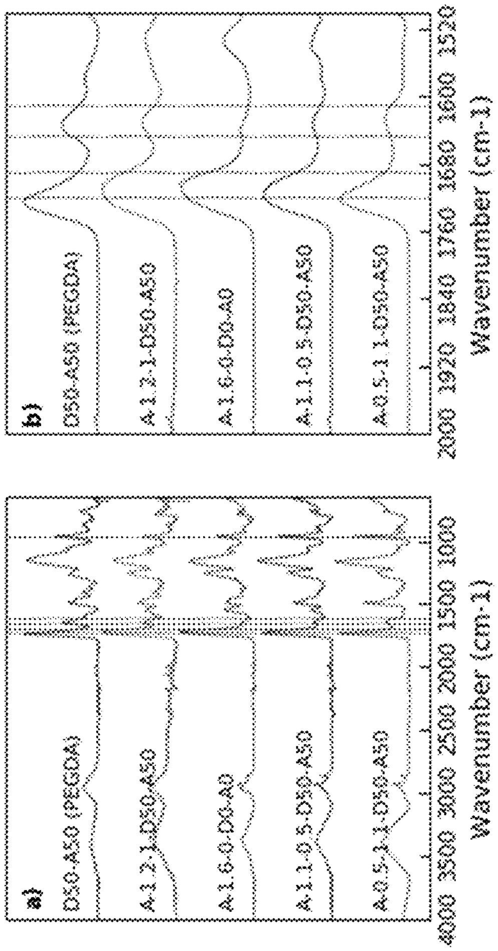
FIG. 11 shows FTIR spectra of DUDA/GDMA-crosslinked membranes. The PEGDA-crosslinked D50-A50 membrane is shown for comparison (top blue line). Vertical lines are placed at 1720 $cm^{-1}$ (C═O stretch in PEGDA, MMA, MAOTMAC), 1690 $cm^{-1}$ (C═O stretch in MAAc), 1647 $cm^{-1}$ (C═O stretch in DMAA), 1610 $cm^{-1}$ (unidentified peak associated with DMAA), and 956 $cm^{-1}$ (quaternary ammonium headgroups in MAOTMAC). a) full spectra; b_) detail of the C═O stretching region.

AEMs showed a distinct, single peak around 3375 $cm^{-1}$, while CEMs showed a flatter response suggestive of double peaks at 3320 $cm^{-1}$ and 3430 $cm^{-1}$, where the latter peak was only visible in the two CEMs with added H-bonding agent (C-210-1.3-H33 and C-241-1.3-H67) (FIG. 7).

FTIR spectra of the dry membranes further confirmed that MAAc (H-bond donor) and DMAA (H-bond acceptor) monomers were incorporated into the polymer structure (FIG. 8*a*, FIG. 8*b*, FIG. 9A, FIG. 9B, FIG. 10, FIG. 11). Individual monomer spectra, shown in FIG. 9A and FIG. 9B, revealed a distinctive peak at 1690 $cm^{-1}$ for MAAc, characteristic of C═O stretching in unsaturated carboxylic acids. DMAA exhibited two distinctive peaks at 1647 $cm^{-1}$ and 1610 $cm^{-1}$. The first is characteristic of C═O stretching in tertiary amides, while the origin of the second peak is not clear. PEGDA (crosslinker), MAOTMAC (charged monomer), and MMA (chain extender) all displayed a strong peak at ~1720 $cm^{-1}$, which corresponds to C═O stretching in unsaturated esters. The incorporation of MAAc into membranes was indicated by the broadening of the ~1720 $cm^{-1}$ peak towards lower frequencies, reflecting the combination of C═O stretching from the unsaturated esters (1720 $cm^{-1}$) and the carboxylic acid (1690 $cm^{-1}$). The presence of DMAA in the membranes resulted in the emergence of an additional C═O peak between 1647 $cm^{-1}$ and 1610 $cm^{-1}$ that was not visible in membranes without DMAA. All membranes exhibited a strong, sharp peak at 956 $cm^{-1}$, which is characteristic of the quaternary ammonium headgroup on MAOTMAC. Notably, none of the membranes exhibited a strong peak in the O—H stretching (3200-3400 $cm^{-1}$) region normally associated with hydrogen bonding.

Performance Data

Figure 12:
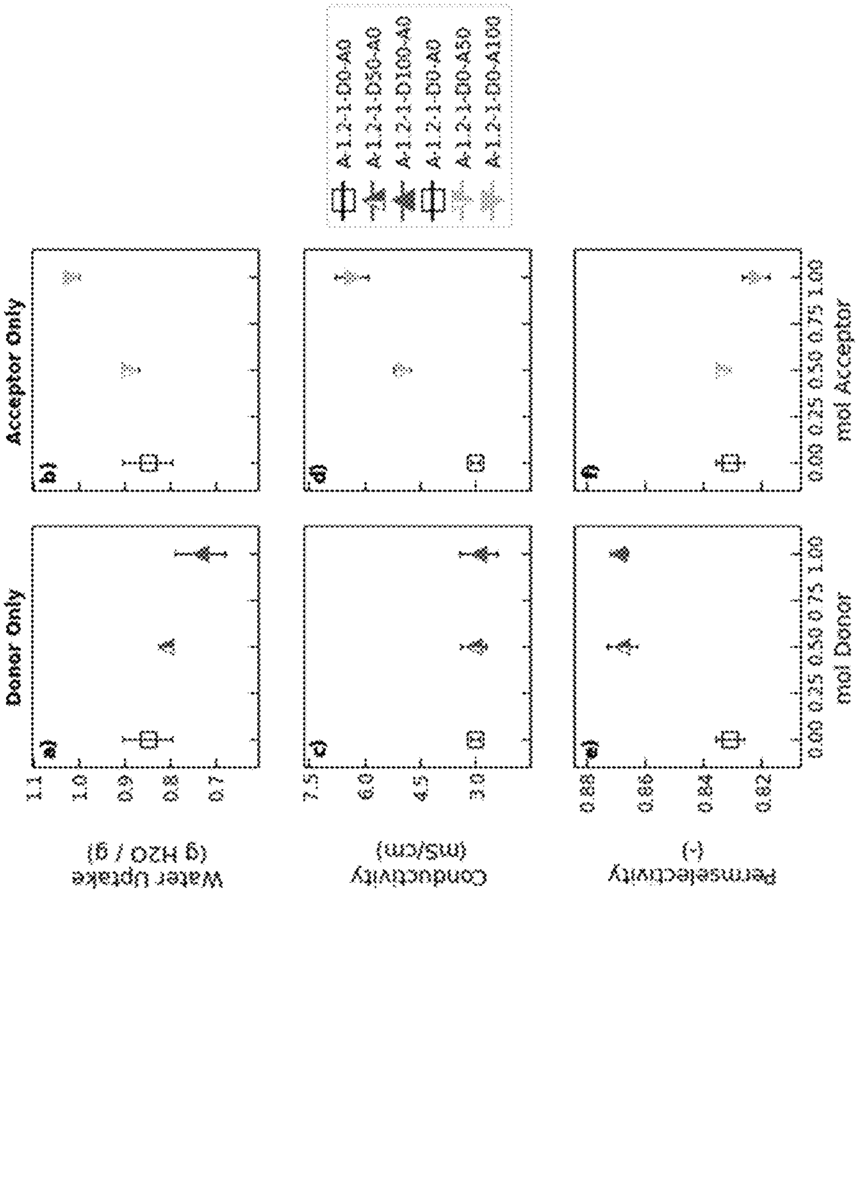
FIG. 12 shows water uptake (a,b), conductivity (c,d), and permselectivity (e,f) vs. hydrogen bond donor (i.e., MAAc) or acceptor (i.e., DMAA) content. Each panel corresponds to a subset of the synthesized membranes in which a single aspect of the composition is varied (e.g., the ratio of donor to acceptor). Thus, some membranes appear in more than one panel. For all membranes shown, the total mol of monoacrylates, PEGDA, and MAOTMAC are fixed (X=1.2 mol, Y=1 mol, Z=1 mol see FIG. 1 and Table 1). Open symbols contain chain extender (MMA); filled symbols contain only donor and acceptor; red color corresponds to MAAc and peach color corresponds to DMAA (see Legend). Error bars represent the standard error of at least five replicate measurements.
Figure 13:
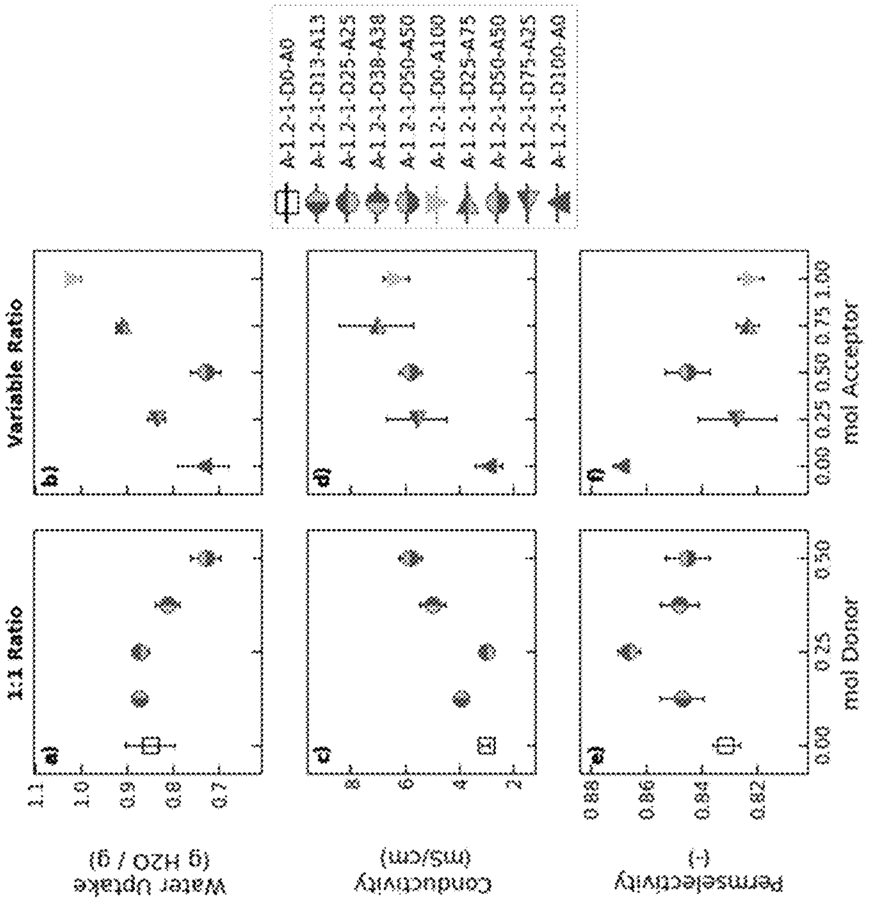
FIG. 13 shows membrane water uptake (a,b), conductivity (c,d), and permselectivity (e,f) vs. hydrogen bond donor (i.e., MAAc) or acceptor (i.e., DMAA) content. Each panel corresponds to a subset of the synthesized membranes in which a single aspect of the composition is varied (e.g., the ratio of donor to acceptor). Thus, some membranes appear in more than one panel. For all membranes shown, the total mol of monoacrylates (Y), crosslinker PEGDA (X), and charged monomer MAOTMAC (Z) are fixed (X=1.2 mol, Y=1 mol, Z=1 mol see FIG. 1 and Table 1). Open symbols contain chain extender (MMA), filled symbols contain only donor and acceptor, red color corresponds to MAAc, and peach color corresponds to DMAA (see legend). Error bars represent the standard error of at least five replicate measurements.

A summary of the synthesized IEM performance data for the DUDA/GDMA crosslinked membranes is shown in Tables 4 and 5 below. FIG. 12 and FIG. 13 show performance of the PEGDA-crosslinked membranes.

TABLE 4

| Sample | Water uptake (g $H_2O$/g) | Conductivity (mS/cm) | Permselectivity (-) | Modulus (Mpa) | Elongation at break (%) |
|---|---|---|---|---|---|
| A-1.2-1-D50-A50 | 0.53 ± 0.005 | 1.18 ± 0.07 | 0.877 ± 0.004 | ND* | ND* |
| A-1.6-0-D0-A0 | 0.47 ± 0.001 | 6.26 ± 0.29 | 0.964 ± 0.028 | 229.4 ± 9.9 | 5.8 ± 2.5 |
| A-1.1-0.5-D50-A50 | 0.58 ± 0.003 | 7.33 ± 0.37 | 0.958 ± 0.030 | 174.9 ± 6.9 | 6.5 ± 1.0 |
| A-0.5-1.1-D50-A50 | 0.93 ± 0.003 | 16.56 ± 0.39 | 0.924 ± 0.031 | 42.0 ± 3.9 | 23.4 ± 2.5 |
| C-1.6-0-D0-A0 | 0.47 ± 0.001 | 1.378 ± 0.012 | 0.602 ± 0.026 | 60.0 ± 2.5 | 8.8 ± 0.7 |
| C-1.1-0.5-D50-A50 | 0.58 ± 0.003 | 2.202 ± 0.093 | 0.610 ± 0.024 | 33.2 ± 1.6 | 9.3 ± 0.7 |
| C-0.5-1.1-D50-A50 | 0.93 ± 0.003 | 2.904 ± 0.097 | 0.556 ± 0.055 | 12.5 ± 0.5 | 16.1 ± 0.9 |

*Not measured.

TABLE 5

| Sample | Swelling Degree (%) | Conductivity (S/m) | Permselectivity (%) | Modulus (Mpa) | Elongation at break (%) |
|---|---|---|---|---|---|
| C-187-1.3-H0 | 47 ± 0.1 | 1.378 ± 0.012 | 60.2 ± 2.6 | 60.0 ± 2.5 | 8.8 ± 0.7 |
| C-210-1.3-H33 | 58 ± 0.3 | 2.202 ± 0.093 | 61.0 ± 2.4 | 33.2 ± 1.6 | 9.3 ± 0.7 |
| C-241-1.3-H67 | 93 ± 0.3 | 2.904 ± 0.097 | 55.6 ± 5.5 | 12.5 ± 0.5 | 16.1 ± 0.9 |
| A-187-1.3-H0 | 78 ± 0.5 | 0.626 ± 0.029 | 96.4 ± 2.8 | 229.4 ± 9.9 | 5.8 ± 2.5 |
| A-210-1.3-H33 | 103 ± 0.3 | 0.733 ± 0.037 | 95.8 ± 3.0 | 174.9 ± 6.9 | 6.5 ± 1.0 |
| A-241-1.3-H67 | 145 ± 1.7 | 1.656 ± 0.039 | 92.4 ± 3.1 | 42.0 ± 3.9 | 23.4 ± 2.5 |

Tensile Modulus

In DUDA/GDMA crosslinked CEMs and AEMs, the addition of H-bond sites lowered the modulus and increased the elongation at break (see Tables 4 and 5 above).

Swelling/Water Uptake

For DUDA/GDMA crosslinked CEMs and AEMs, addition of hydrogen bond sites dramatically increases the swelling degree, The SD of H67 membranes was roughly double that of membranes with no hydrogen bond crosslinks (see Tables 4 and 5 above).

In PEGDA-crosslinked membranes, addition of hydrogen bond donor sites slightly decreased water uptake, while addition of hydrogen bond acceptor sites increased water uptake (see FIG. 12). When the donor and acceptor monomers were added in a 1:1 ratio, the overall water uptake decreased (see FIG. 13)

B. Morphology

Figure 14:
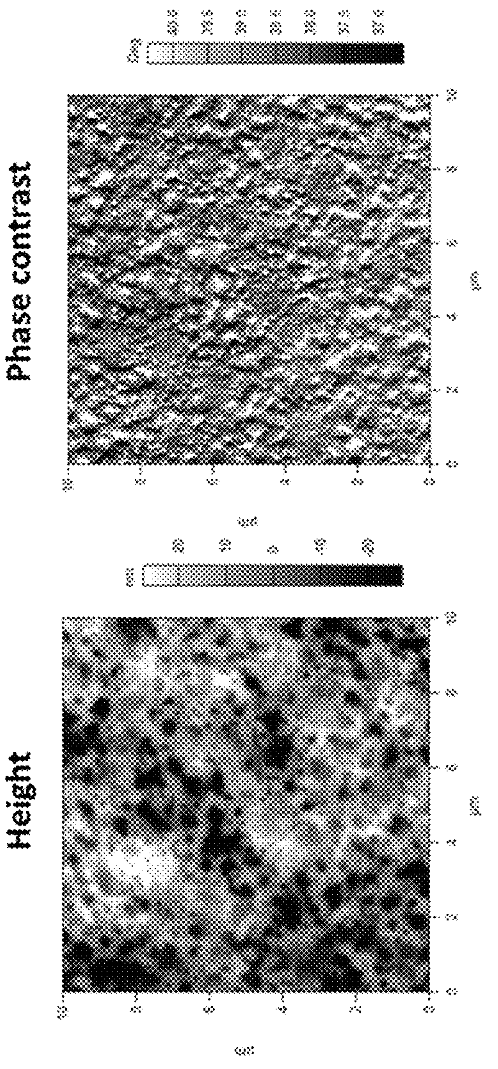
FIG. 14 shows height (left) and phase contrast (right) atomic force microscopy images of a dry PEGDA-crosslinked membrane containing both MAAc and DMAA.

Phase contrast atomic force microscopy images of the dry PEGDA-crosslinked membranes indicate a microscopic phase-separated structure (FIG. 14).

Conductivity

In PEGDA-crosslinked membranes, addition of hydrogen bond donor had little effect on conductivity, while addition of hydrogen bond acceptor increased conductivity (FIG. 13 and FIG. 12). When added together, the combination of hydrogen bond donor and acceptor increased membrane conductivity (FIG. 13)

In DUDA/GDMA crosslinked membranes, adding hydrogen bond donor and acceptor in a 1:1 ratio increased membrane conductivity in all cases (Tables 4 and 5). The conductivity of the H67 membrane was 2-3× that of the H0 (no added hydrogen bonding sites) membranes.

Permselectivity

In PEGDA-crosslinked membranes, addition of hydrogen bond donor had increased permselectivity, while addition of hydrogen bond acceptor had no effect (FIG. 13). When added together, the combination of hydrogen bond donor and acceptor generally resulted in a higher permselectivity than the control membrane containing no donor or acceptor (FIG. 12). In DUDA/GDMA crosslinked membranes, adding hydrogen bond donor and acceptor in a 1:1 ratio slightly decreased permselectivity (Tables 4 and 5).

Conductivity-Permselectivity Tradeoff

Figure 16:
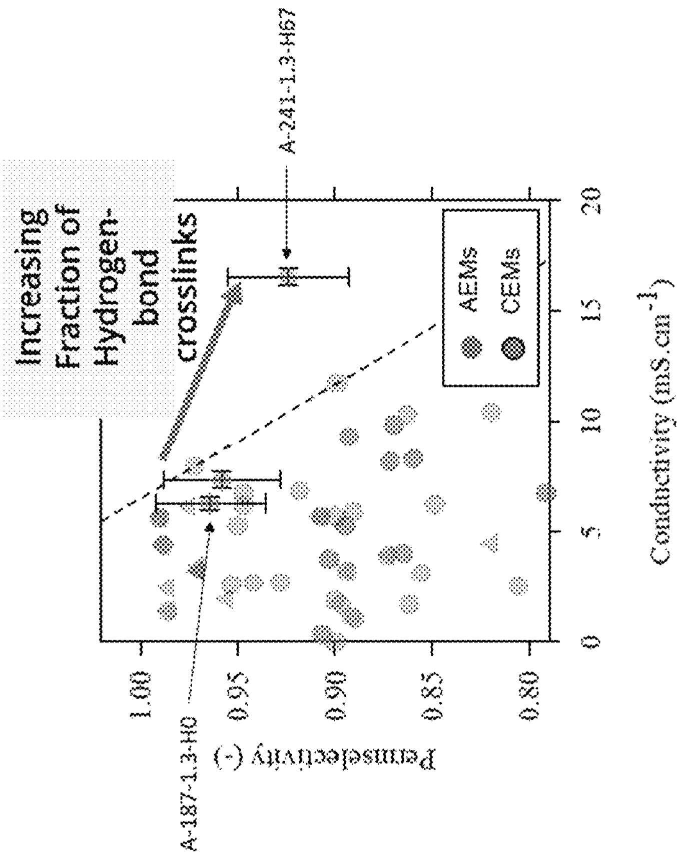
FIG. 16 shows a magnified plot of representative conductivity-permselectivity comparing conventional and lab synthesized IEMs without hydrogen bond enrichment (triangles and circles, respectively) with the synthesized AEMs described herein (diamonds). The dashed line represents the approximate performance frontier of conventional IEMs without hydrogen bond enrichment.

The introduction of additional hydrogen bonding sites dramatically increased the conductivity of the IEMs without substantially changing their permselectivity. In IEMs, it is desirable for membranes to have both high conductivity and high permselectivity; however high permselectivity and high conductivity typically exhibit a tradeoff relationship among other commercial and lab synthesized IEMs (FIG. 15 and FIG. 16). See also Geise et al. (2013) *ACS Appl. Mater. Interfaces* 5: 10294-10301; Güler et al. (2013) *J Membr. Sci.* 446: 266-276; and Güler et al. (2012) *ChemSusChem* 5(11): 2262-2270. The subject matter disclosed herein shows that the introduction of hydrogen bond donor and/or acceptor monomers into a polymer membrane enables simultaneously higher conductivity and permselectivity than state-of-the-art membranes without such features (see FIG. 15).

The foregoing is illustrative of the present invention, and is not to be construed as limiting thereof. The invention is defined by the following claims, with equivalents of the claims to be included therein.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer network comprising:

(a) a plurality of polymer backbones formed by co-polymerization of:

i. a first monomer having a hydrogen bond donor end group and/or a second monomer having a hydrogen bond acceptor end group;

ii. a third monomer having a positively charged or negatively charged end group; and iii. a crosslinker;

(b) a plurality of covalent crosslinks between the plurality of polymer backbones;

(c) a plurality of reversible, non-covalent crosslinks between the plurality of polymer backbones; and (d) a plurality of ionic side groups pendant from the plurality of polymer backbones.

2. The polymer network of claim 1, wherein the network comprises the first monomer having a hydrogen bond donor end group and the second monomer having a hydrogen bond acceptor end group.

3. The polymer network of claim 1, wherein the first monomer is a methacrylic acid (MAAc) monomer.

4. The polymer network of claim 1, wherein the second monomer is a N,N-dimethacrylamide (DMAA) monomer.

5. The polymer network of claim 1, wherein each of the first monomer and the second monomer are monoacrylates.

6. The polymer network of claim 1, wherein the first monomer and the second monomer together are present in an amount of from about 1 wt % to about 25 wt %.

7. The polymer network of claim 1, wherein the first monomer and the second monomer together are present in an amount of from about 0.01% to about 67%, on a molar fraction basis.

8. The polymer network of claim 1, wherein the third monomer is a 2-acrylamido-2-methylpropane sulfonic acid (AMPS) monomer or a [2-(methacryloxyloxy)ethyl] trimethylammonium chloride (MAOTMAC) monomer.

9. The polymer network of claim 1, wherein the first monomer is a MAAc monomer, the second monomer is a DMAA monomer, and the third monomer is an AMPS monomer or a MAOTMAC monomer.

10. The polymer network of claim 1, wherein the crosslinker is a diacrylate or a dimethacrylate.

11. The polymer network of claim 1, wherein the crosslinker is poly(ethylene glycol) diacrylate (PEGDA).

12. The polymer network of claim 1, wherein the crosslinker is selected from diurethane dimethacrylate (DUDA) and glycerol dimethacrylate (GDMA), or a combination thereof.

13. The polymer network of claim 12, wherein the crosslinker is a combination of DUDA and GDMA, and wherein the ratio of DUDA to GDMA is about 3:1.

14. The polymer network of claim 1, wherein the molar ratio of the crosslinker to the third monomer is from about 0.5:1 to 2:1.

15. The polymer network of claim 1, wherein the molar ratio of the first and second monomer, combined, to the third monomer is from about 0.5:1 to 1.5:1.

16. The polymer network of claim 1, further comprising a fourth monomer, wherein the fourth monomer is a chain extender.

17. The polymer network of claim 16, wherein the chain extender is methyl methacrylate.

18. A membrane having a porous support and a polymer layer comprising the polymer network of claim 1.

19. A polymer film comprising the polymer network of claim 1, wherein the polymer film is formed on a glass substrate.

20. A method of making a polymer network, the method comprising co-polymerizing:

(a) a first monomer having a hydrogen bond donor end group and/or a second monomer having a hydrogen bond acceptor end group;

(b) a third monomer having a positively- or negatively-charged end group; and (c) a crosslinker, wherein the polymer network comprises a plurality of polymer backbones, a plurality of covalent crosslinks between the plurality of polymer backbones, a plurality of reversible, non-covalent crosslinks between the plurality of polymer backbones, and a plurality of ionic side groups pendant from the plurality of polymer backbones.

* * * * *